United States Patent
Wason

(10) Patent No.: US 9,330,078 B2
(45) Date of Patent: May 3, 2016

(54) RICH TEXT HANDLING FOR A WEB APPLICATION

(71) Applicant: INTERNATIONAL BUSINESS MACHINES CORPORATION, Armonk, NY (US)

(72) Inventor: James R. Wason, Tuxedo, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 13/941,688

(22) Filed: Jul. 15, 2013

(65) Prior Publication Data

US 2013/0305141 A1   Nov. 14, 2013

Related U.S. Application Data

(60) Continuation of application No. 12/940,479, filed on Nov. 5, 2010, now Pat. No. 8,543,909, which is a division of application No. 10/606,547, filed on Jun. 26, 2003, now Pat. No. 7,890,852.

(51) Int. Cl.
G06F 17/22      (2006.01)
G06F 17/24      (2006.01)
G06F 17/27      (2006.01)

(52) U.S. Cl.
CPC ........ *G06F 17/2276* (2013.01); *G06F 17/2247* (2013.01); *G06F 17/24* (2013.01); *G06F 17/273* (2013.01); *Y10S 707/99942* (2013.01)

(58) Field of Classification Search
CPC . G06F 17/24; G06F 17/2247; G06F 17/2276; G06F 17/273
See application file for complete search history.

(56) References Cited

U.S. PATENT DOCUMENTS

| | | |
|---|---|---|
| 4,029,236 A | 6/1977 | Carson, Jr. et al. |
| 4,366,919 A | 1/1983 | Anderson |
| 4,833,610 A | 5/1989 | Zamora et al. |
| 5,301,842 A | 4/1994 | Ritter |
| 5,604,897 A | 2/1997 | Travis |
| 5,694,610 A | 12/1997 | Habib et al. |
| 5,765,180 A | 6/1998 | Travis |
| 5,787,451 A | 7/1998 | Mogilevsky |

(Continued)

OTHER PUBLICATIONS

Chen et al., "A GUI Environment to Manipulate FSMs for Testing GUI-based Applications in Java", 2001, IEEE, pp. 1-10.

(Continued)

*Primary Examiner* — Maikhanh Nguyen
(74) *Attorney, Agent, or Firm* — Matthew Chung; Andrew M. Calderon; Roberts Mlotkowski Safran & Cole, P.C.

(57) ABSTRACT

A method and apparatus for representing and controlling documents including rich text for Web based applications and browsers is provided so that editing of rich text can be facilitated within the browsers. The rich text is represented in a memory structure so that various formats may be flexible maintained. Text, images, tables, links and the like are represented in the memory structure, which may be maintained in databases for eventual editing. A controller class and subsidiary classes represent the rich text and provide methods to convert html to the memory structure and back, representing the rich text in a relational database, retrieving the rich text from a relational database, and presenting the rich text for editing. A spell checking facility for the rich text is included.

19 Claims, 26 Drawing Sheets

(56) References Cited

U.S. PATENT DOCUMENTS

| | | | |
|---|---|---|---|
| 5,832,268 A | 11/1998 | Anderson et al. | |
| 5,845,306 A | 12/1998 | Schabes et al. | |
| 5,977,967 A | 11/1999 | Berner et al. | |
| 5,991,713 A * | 11/1999 | Unger et al. | 704/9 |
| 5,999,938 A | 12/1999 | Bliss et al. | |
| 6,047,300 A | 4/2000 | Walfish et al. | |
| 6,085,206 A | 7/2000 | Domini et al. | |
| 6,105,036 A | 8/2000 | Henckel | |
| 6,131,102 A | 10/2000 | Potter | |
| 6,182,092 B1 * | 1/2001 | Francis et al. | 715/227 |
| 6,330,574 B1 * | 12/2001 | Murashita | 715/236 |
| 6,345,307 B1 * | 2/2002 | Booth | 709/247 |
| 6,374,210 B1 | 4/2002 | Chu | |
| 6,381,620 B1 | 4/2002 | Matsuura et al. | |
| 6,408,206 B1 | 6/2002 | Kroll et al. | |
| 6,454,138 B1 | 9/2002 | Greenhill et al. | |
| 6,456,209 B1 * | 9/2002 | Savari | 341/67 |
| 6,470,364 B1 | 10/2002 | Prinzing | |
| 6,496,202 B1 | 12/2002 | Prinzing | |
| 6,601,059 B1 | 7/2003 | Fries | |
| 6,883,137 B1 * | 4/2005 | Girardot et al. | 715/242 |
| 7,047,493 B1 | 5/2006 | Brill et al. | |
| 7,111,011 B2 | 9/2006 | Kobayashi et al. | |
| 7,178,100 B2 * | 2/2007 | Call | 715/210 |
| 7,222,298 B2 * | 5/2007 | Monterrosas | 715/234 |
| 7,246,060 B2 | 7/2007 | Geidl et al. | |
| 7,444,348 B2 | 10/2008 | Fries et al. | |
| 7,581,170 B2 | 8/2009 | Baumgartner et al. | |
| 7,594,168 B2 * | 9/2009 | Rempell | 715/234 |
| 2001/0042081 A1 * | 11/2001 | MacFarlane et al. | 707/513 |
| 2002/0029229 A1 * | 3/2002 | Jakopac et al. | 707/500 |
| 2002/0071139 A1 * | 6/2002 | Janik | G06F 3/147 358/1.15 |
| 2002/0143521 A1 * | 10/2002 | Call | 704/1 |
| 2002/0147724 A1 | 10/2002 | Fries et al. | |
| 2003/0007397 A1 | 1/2003 | Kobayashi et al. | |
| 2003/0014442 A1 | 1/2003 | Shiigi et al. | |
| 2003/0088410 A1 | 5/2003 | Geidl et al. | |
| 2003/0200254 A1 | 10/2003 | Wei | |
| 2004/0148307 A1 * | 7/2004 | Rempell | 707/102 |
| 2004/0216591 A1 | 11/2004 | Assadi et al. | |
| 2004/0230550 A1 * | 11/2004 | Simpson et al. | 707/1 |

OTHER PUBLICATIONS

Office Action dated Apr. 7, 2015 for U.S. Appl. No. 13/948,728, 10 pages.

Notice of Allowance dated Oct. 1, 2015 for U.S. Appl. No. 13/948,728, 26 pages.

Final Office Action dated Jul. 23, 2015 for U.S. Appl. No. 13/948,728, 14 pages.

* cited by examiner

RICH TEXT NODE

FONT FACE
        (HELVETICA ,VERDANA ,ROMAN,...)

FONT COLOR
        (BLACK ,BLUE, RED,....)

FONT FACE
        (3)

BOLD
        TRUE/FALSE

UNDERLINE
        TRUE/FALSE

IMAGE
        TRUE/FALSE

NEW PARAGRAPH
        TRUE/FALSE

TEXT

TABLE NODE ANCHOR

*LANGUAGE:
ENGLISH

*TITLE/SUBJECT:

*BODY TEXT
POST A SYNOPSIS OR FULL TEXT, ATTACH ANY ASSOCIATED FILES, AND/OR INCLUDE ANY APPROPRIATE URLS, TO COPY AND PASTE FROM WORDPRO, YOU MUST SAVE AS HTML, AND REOPEN IN INTERNET EXPLORER.
208

JJGHGJJGGGGGGGGGGGGGGGGGGGGGGGGGGGGGGGGGG

SELECT AN ACTION AND CLICK SAVE.
ACTIONS:
SAVE AS DRAFT

*FIG. 11C*

RICH TEXT HANDLING FOR A WEB APPLICATION

CROSS REFERENCE TO RELATED APPLICATIONS

The present application is a continuation application of co-pending application Ser. No. 12/940,479, filed on Nov. 5, 2010, its contents being incorporated by reference in its entirety herein.

BACKGROUND OF THE INVENTION

1. Field of the Invention

The present invention generally relates to rich text capability for Web based applications and Web browsers, and more specifically, to a system and method for representing and controlling rich text in memory and various text representations.

2. Background Description

Web browser based applications are becoming increasingly popular. These browser based applications necessarily handle documents of various types. However, document handling and management of documents as they change over time to include new or varying content can be very expensive and cumbersome. Flexibility in representing and handling documents, including those stored in relational databases, is limited. One specific example of a major drawback is the lack of a robust rich text capability.

Standard Web browsers do not provide full feature rich text edit functions. This includes, for example, the general lack of ability to change font face, size and color, underline, bold, italic, to create tables and lists (both ordered and unordered), to check spelling, and to add in-line images or file attachments. Further, images and file attachments typically cannot be added as links to other Uniform Resource Locators (URL), or uploaded from a local file system into Binary Large Object (BLOB) data stored on a server.

Some known web browsers have features that allow direct editing of hypertext mark-up language (html) features of a page (i.e., the "content editable" feature) which effectively creates a text area that allows limited rich text editing. These browsers, however, do not provide any method to save changes to rich text that have been made through its editing facilities. Most browsers, however, do not provide any rudimentary text or other type of editing features.

The present invention overcomes the problems set forth.

SUMMARY OF THE INVENTION

In an aspect of the present invention, a method is provided for managing rich text applications such as Web based applications and browsers. The method comprises representing the rich text in a memory structure representation and providing one or more classes for use by the applications and browsers to create the memory structure representation representative of rich text. The classes include a rich text list class for managing one or more rich text nodes and a rich text class to create rich text nodes that represent a unit of rich text and its attributes. When editing rich text in a document, the memory structure representation is used that was created by the provided classes.

In another aspect, a method is provided to represent and manage rich text for use by applications and browsers that involves representing the rich text in a memory structure representation and providing classes for use by the application and browsers to create the memory structure representation. A spell checker is additionally provided to facilitate correcting misspelled words. The spell checker utilizes the memory structure representation and the provided rich text classes. The spell checker employs a dictionary wherein each word of the dictionary has a signature associated with the word to facilitate searching for substitute words.

In another aspect, an apparatus of the invention provides components for representing and managing rich text for use by the applications and browsers. The apparatus includes a component for representing rich text in a memory structure representation and a component for providing one or more classes for use by the applications and browsers to create the memory structure representation. A component for editing rich text in a document using the rich text classes is provided, as is a spell-checking component.

In another aspect of the invention, a computer program codes comprising a computer usable medium having a computer readable program code embodied in the medium is provided. The computer program codes include a first computer program code to provide one or more classes for use by applications to at least create and manage one or more rich text nodes in a memory structure representation representative of rich text. Additionally, a second computer program code to represent the rich text in the memory structure representation, and a third computer program code to edit rich text in a document using the memory structure representation to perform editing functions on a document having rich text as managed and created by the one or more classes are provided.

BRIEF DESCRIPTION OF THE DRAWINGS

The foregoing and other objects, aspects and advantages will be better understood from the following detailed description of a preferred embodiment of the invention with reference to the drawings, in which:

FIG. 2C is a description of possible contents of a rich text node according to the present invention;

Figure 11A:
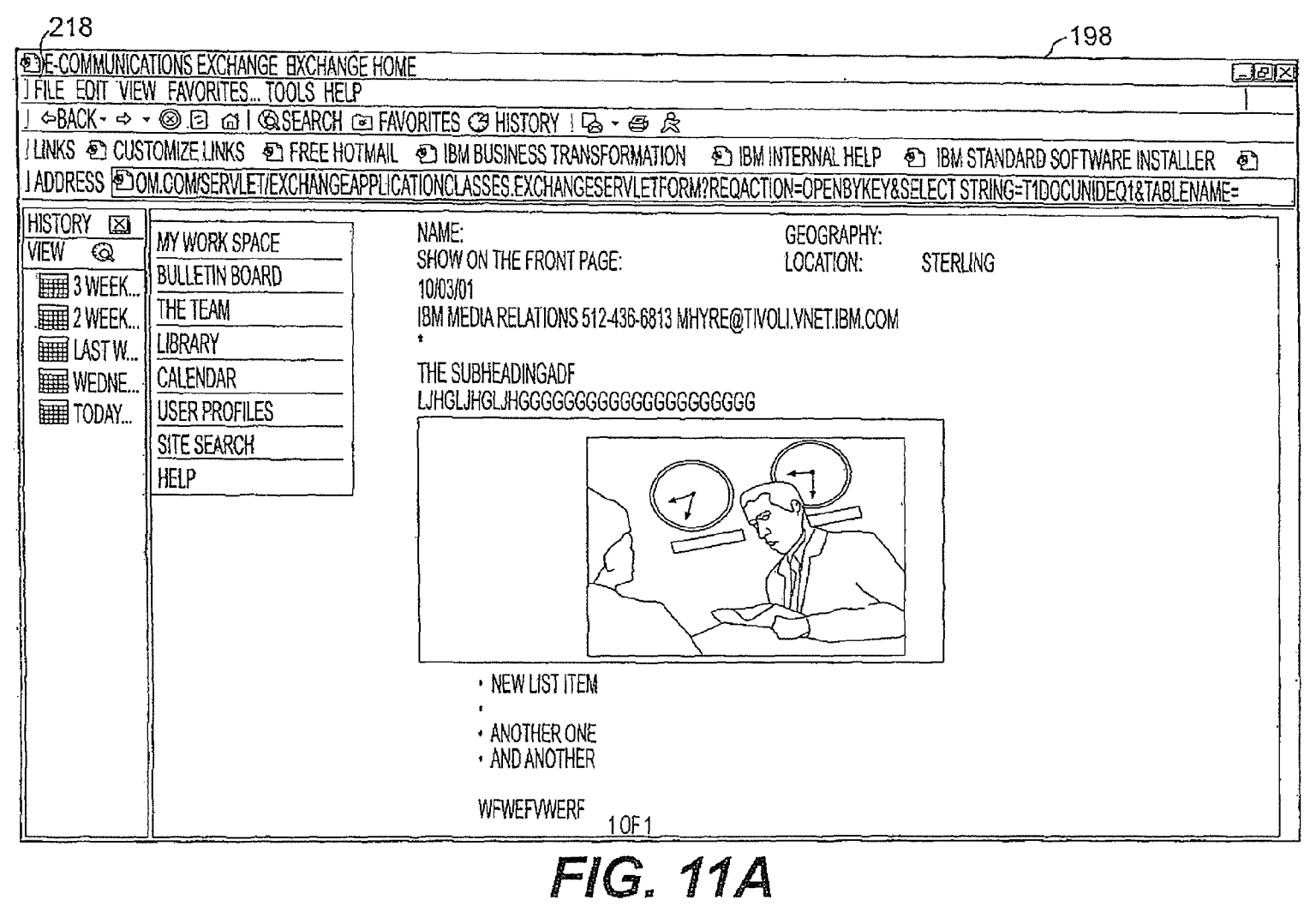

FIG. 11A is an illustration of a browser screen in browse mode with rich text according to the present invention;

FIG. 11C is another example of an edit screen and tool bar controls for editing rich text according to the present invention;

DETAILED DESCRIPTION OF A DETAILED EMBODIMENT OF THE INVENTION

This invention provides a full feature rich text edit capability for a standard Web browser and other applications. In particular, the present invention provides a method and system to consistently represent rich text in memory structure in order to facilitate editing and managing documents containing such rich text. These memory structures may be resident on a computer, server or other known hardware. The documents may include, for example, html documents presented via a web browser or other web based applications. These documents may contain text, tables, images, links and the like in which the system and method of the present invention represents such elements as rich text in such documents. By utilizing the system and method of the present invention, it is now possible to edit and save such documents in many types of environments thus providing flexibly and robust management and control capabilities. The present invention is described with illustration to the Enterprise Application Development Platform (EADP) developed by International Business Machine Corporation. This environment is shown for illustrative purposes and it should be understood by those of ordinary skill in the art that any other suitable context may be alternatively employed and implemented by the present invention.

System and Structure of the Present Invention

Figure 1:
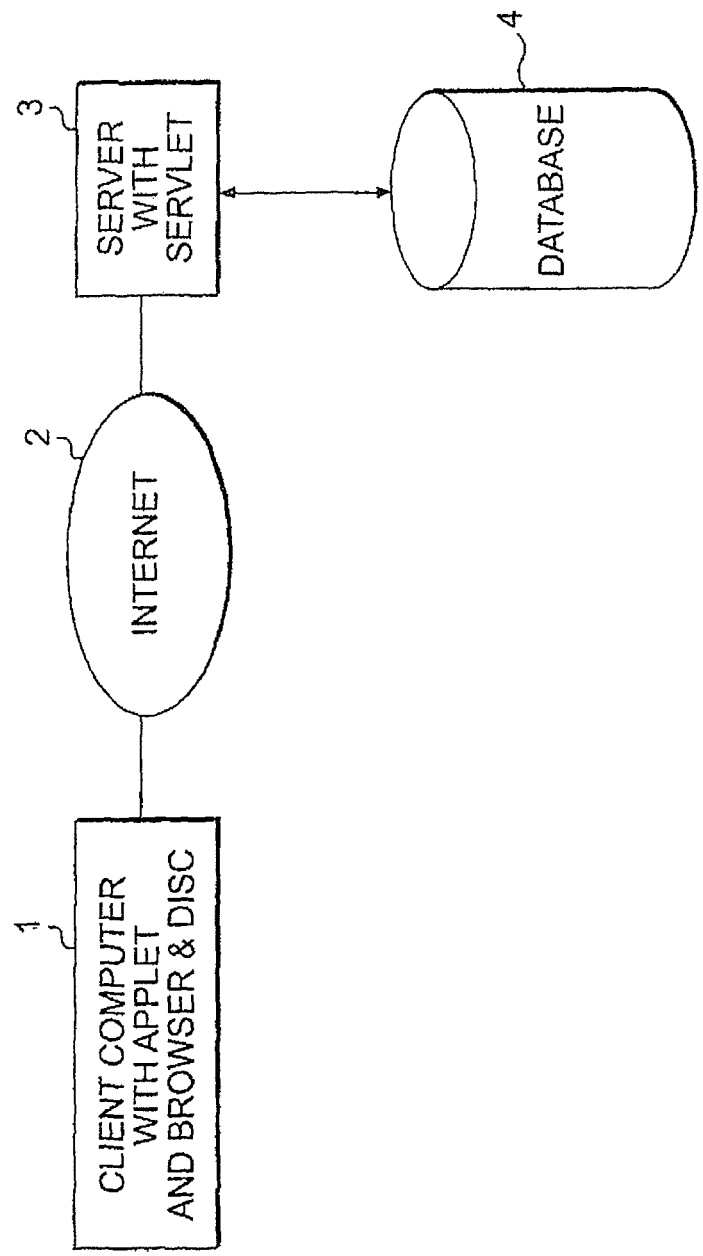
FIG. 1 is a block diagram showing an illustrative context of the present invention.

Now referring to FIG. 1, an exemplary environment of the invention is shown. In this exemplary environment, a client computer 1 is provided with a browser having an applet for accessing Web applications typically over a network such as the Internet 2. A server 3 with servlet is connected to the Internet 2 and a database 4. The server 3 and associated database 4 provides for a Web based application in communication with the client computer 1. In an embodiment, the browser can be optimized for providing capabilities for any known browser or application. This is achieved by controlling rich text from its memory representation. All other representations such as in a database, html from a Web browser, or any other new potential source such as Rich Text Format (RTF) format, may be mapped to the controlled memory format. The memory format may then be used to create new representations of the rich text for various purposes such as, for example, editing, or to show misspelled words by highlighting, html, plain text, and the like.

By way of illustration, in memory, each rich text field is represented by a controller class (e.g., the rich text class), and subsidiary classes that hold the rich text content. The most basic of these is the rich text node, which represents a single atomic unit of the rich text (i.e., text with its attributes such as font face, font size, underlining, italics, etc.). The rich text node may also have attributes to determine, for example, if the text is bold, underlined, italic, or another attribute may determine if that text node should start a new paragraph. Essentially any text attribute can be represented.

Memory Structure

Figure 2A:
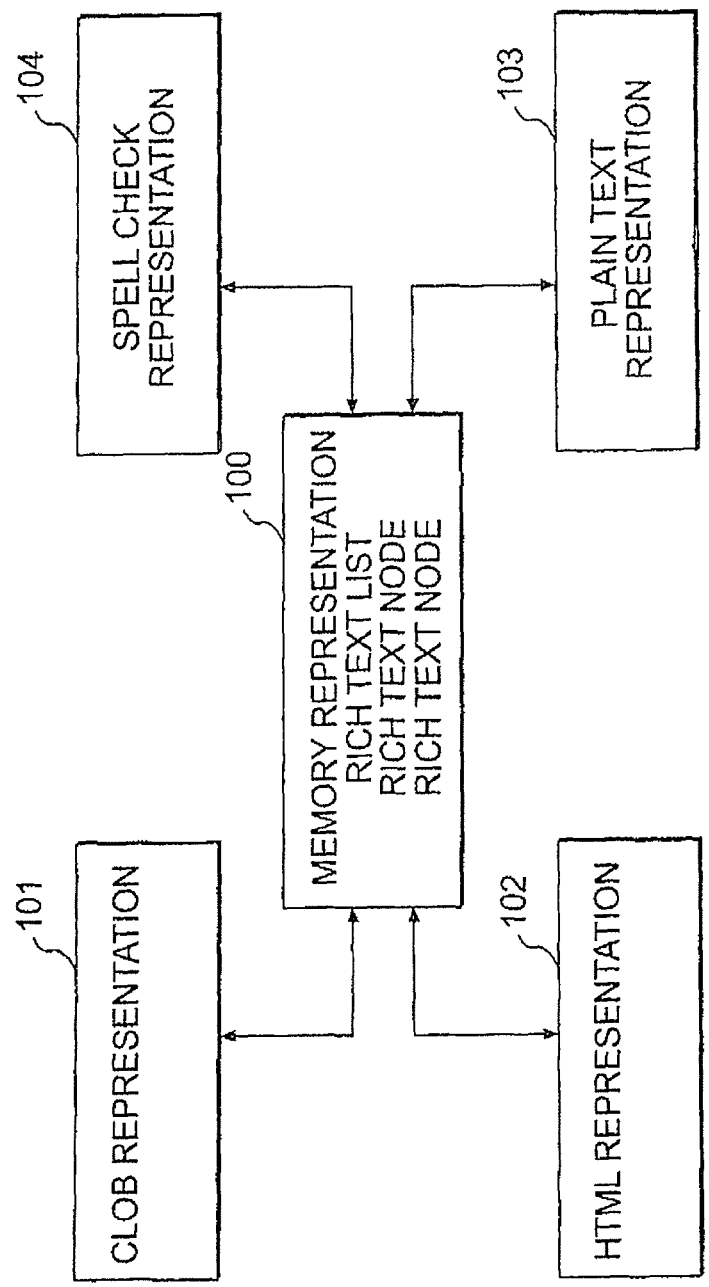
FIG. 2A is a relational block diagram illustrating various aspects according to the present invention.

FIG. 2A is a relational block diagram illustrating various aspects according to the present invention. In particular, FIG. 2A shows a memory structure 100 comprising a rich text list class for controlling the collection of rich text nodes (e.g., RichTextNode in EADRichTextNode class) in various string representations, generally represented as 101, 102, 103, and 104. The string representations 101-104 may include, for example, a long string stored as a Character Large Object (CLOB) 101 in a database (such as a relational database DB2), html representation 102 to display on the Web, plain text 103 to use as the editable text of a rich text editor, and text 104 used for spell checking. As described below, the present invention also provides methods (e.g., JAVA methods, or the like) to access and convert rich text structures from and into various formats.

Figure 2B:
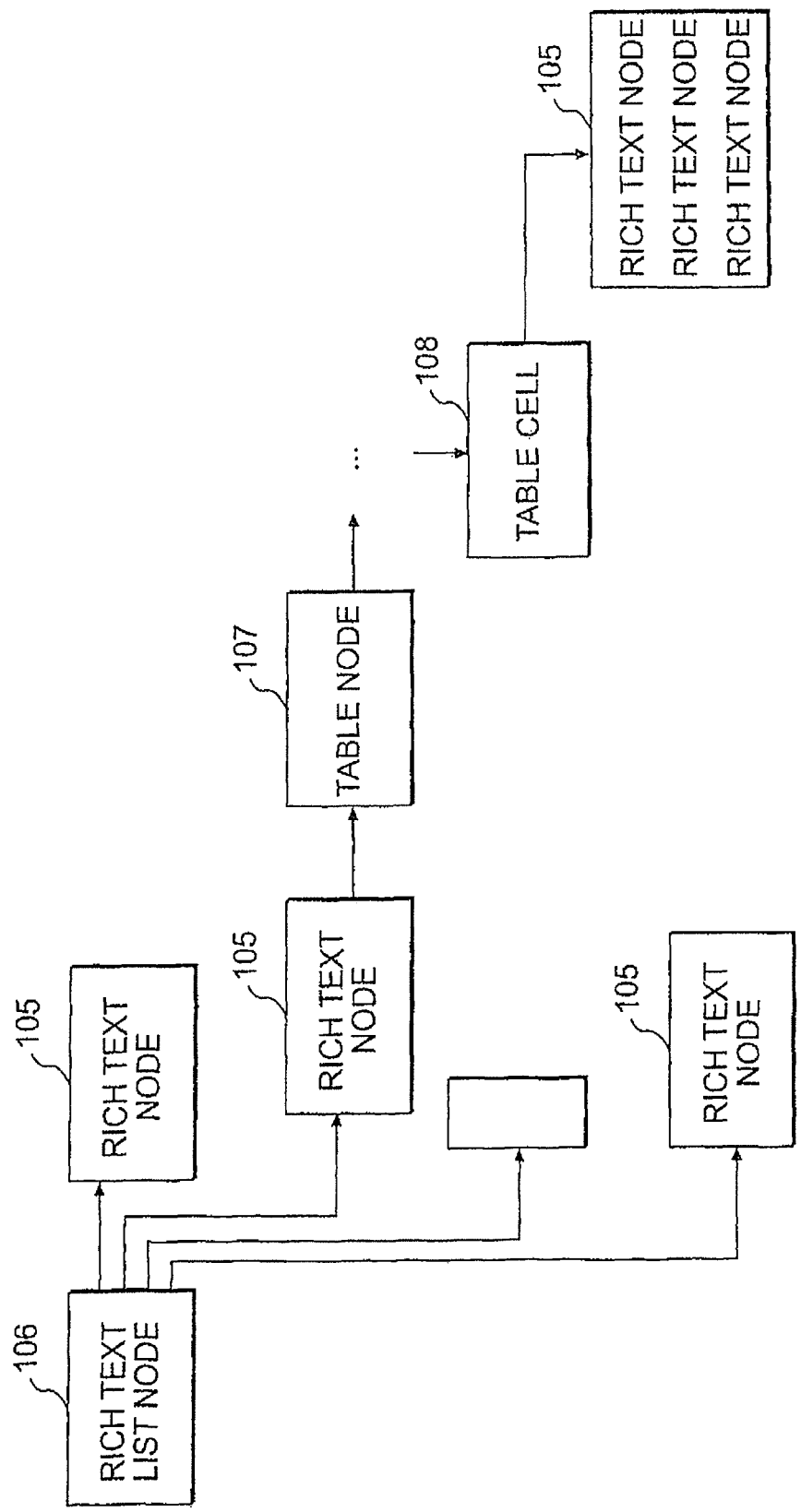
FIG. 2B is a relational block diagram for a rich text list and rich text nodes according to the present invention.

FIG. 2B is a relational block diagram for a rich text list and rich text nodes according to the present invention. In this illustration, one or more rich text nodes 105, which make up the rich text, are controlled by a rich text list class node 106 (e.g., EADPRichTextList). The rich text list class node 106 is a controller class, which contains a top-level list of one or more rich text nodes 105. These rich text nodes 105 can then be used to start table nodes 107 that eventually point down to other rich text nodes 105 in table cells 108 that include heading and row cells. This nested structure of text nodes and tables may be representative of the general memory structure of the rich text. At its simplest, this rich text list class 106 maintains a list of rich text nodes 105 (e.g., RichTextNode). However, representing tables and lists may include nested structures of rich text nodes 105, table nodes 107, and table cells 108.

FIG. 2C is a description of possible contents of a rich text node, i.e., RichTextNode class and its memory structure. This RichTextNode class is used in conjunction with applications such as Web browsers and the class is instantiated as necessary when used by the applications. At its simplest, rich text contains text (string data) with attributes to control its presentation. These may include for example the font face, font size, font color, and whether or not the text is italicized, underlined, or bold. Segments of text where these attributes are the same are represented as a single rich text node (e.g., the JAVA class EADPRichTextNode). The RichTextNode class of a rich text node 105 may include a few additional properties, such as whether it is at a line break, or whether it starts a table. The text property is used to store the text string for a rich text node. In this case the contents of an html image tag (or xml) are stored in the text property of the rich text nodes. The rich text node can also represent the location of an image or link. In this case it stores all the information need to create the html for that image or link.

Figure 3:
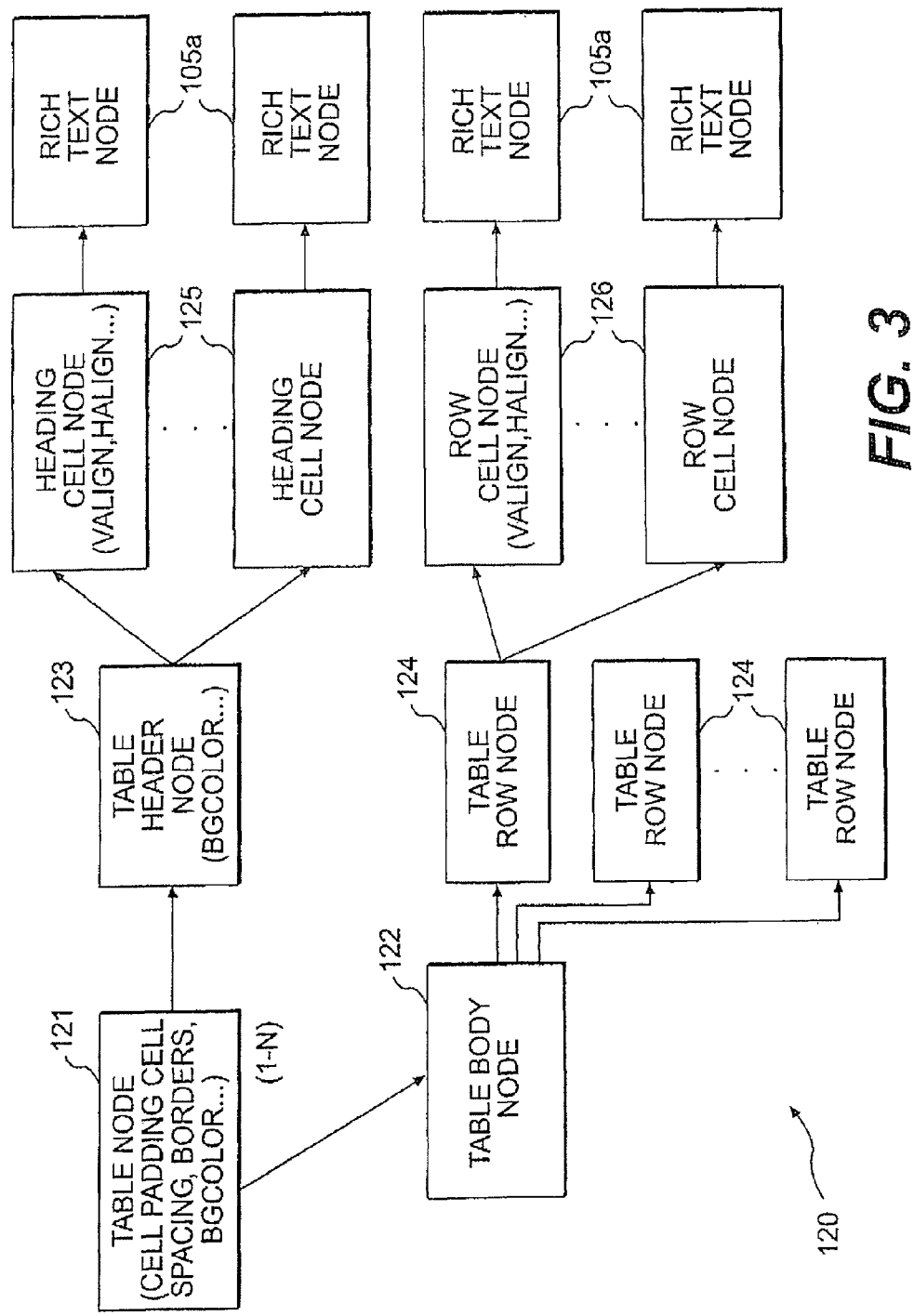
FIG. 3 is a relational block diagram of table node and subclass nodes according to the present invention.

FIG. 3 is a relational block diagram of table nodes and sub class nodes. Specifically, FIG. 3 shows a table structure generally shown as 120. The format of the table structure 120 may be represented in memory as a set of special rich text node types including table node 121, table body node 122 and table header node 123 (for defining table characteristics), table row node 124, heading cell node 125 and row cell node 126 corresponding to the various types of html tags controlling table representation. In embodiments, each type of node maintains a reference to the nodes it controls for the next level. For example, the table row node 124 controls a list of row cell nodes 126, and the table body node 122 controls a list of table row nodes 124. The header cell node 125 and row cell node 126 maintain lists of rich text nodes 105a, representing the content of those cells. The rich text node 105a, in turn, may contain an anchor point to another table node 121 to start a new table at that point in the rich text. This structure allows for nested tables.

Most manipulation of the rich text is performed in its memory format as described above. The present invention also provides methods to transform the text from its memory format into the string representations and vice versa. In embodiments, the rich text is stored as a string in the relational database, and may be stored in a CLOB column due to a potentially large string size. Of course, there are alternative ways that this string can be formatted such as converting the rich text into the html string for storage. Another is to convert into xml. This approach may have some advantages if other applications are able to process the xml directly as it is stored in the relational database. A third alternative, which has the advantage of requiring less storage space, is to use a compressed format where the various attributes of each rich text node are captured, along with the text value for that node. For all three alternatives, the method to convert the rich text to string is similar to the method for generating an html string, except for formatting of each part of the string.

Creating Rich Text Memory Structure from html

In embodiments, there are two aspects of creating rich text memory structures from html. In a first aspect, the rich text node has the ability to parse a well-formed segment of html and set its attributes accordingly. This includes the ability to create other rich text nodes as needed as the html indicates a change in text attributes or the presence of an image or link. In a second aspect, a function in the rich text list takes html that may not be well formed (i.e., non-well formed html), and preprocesses the html to make it recognizable by the rich text nodes. The rich text list also handles creating the nodes for the table structures included within the html.

The rich text node has the ability to parse a well-formed segment of html. A well formed segment of html may include, for example:

1. Plain text outside tags;
2. A tag that does not require an end tag is well formed.
3. If a tag has a corresponding end tag then the content between the start and end tag, and does not contain a tag of the same type; and
4. Tags that are not of interest to the rich text node are suppressed.

The tags that are of particular interest are table type tags, image and link tags, and the tags for the rich text attributes (e.g., font, italic, bold, underline, break and paragraph tags). A set of these tags can be used to define the attributes for one rich text node. For example a single rich text node may be represented as:

<p><i><strong><u><font face="verdana" size="3" color="black">Hello world<font></u><strong>-;</i> which looks like

Hello World (type size is "3" and color is black)

However, suppose the passed html included a font change, located, for example, in the middle:

<p><i><strong><u><font face="verdana" size="3'color="black>Hello<font><font face="verdana" size="5" color="red">world<font><u><strong>cz/i&g-t;

which now looks like this

Hello World (type size of "Hello is "3" color is black while the type size of "world" is now "5", and color is red)

Figure 4:
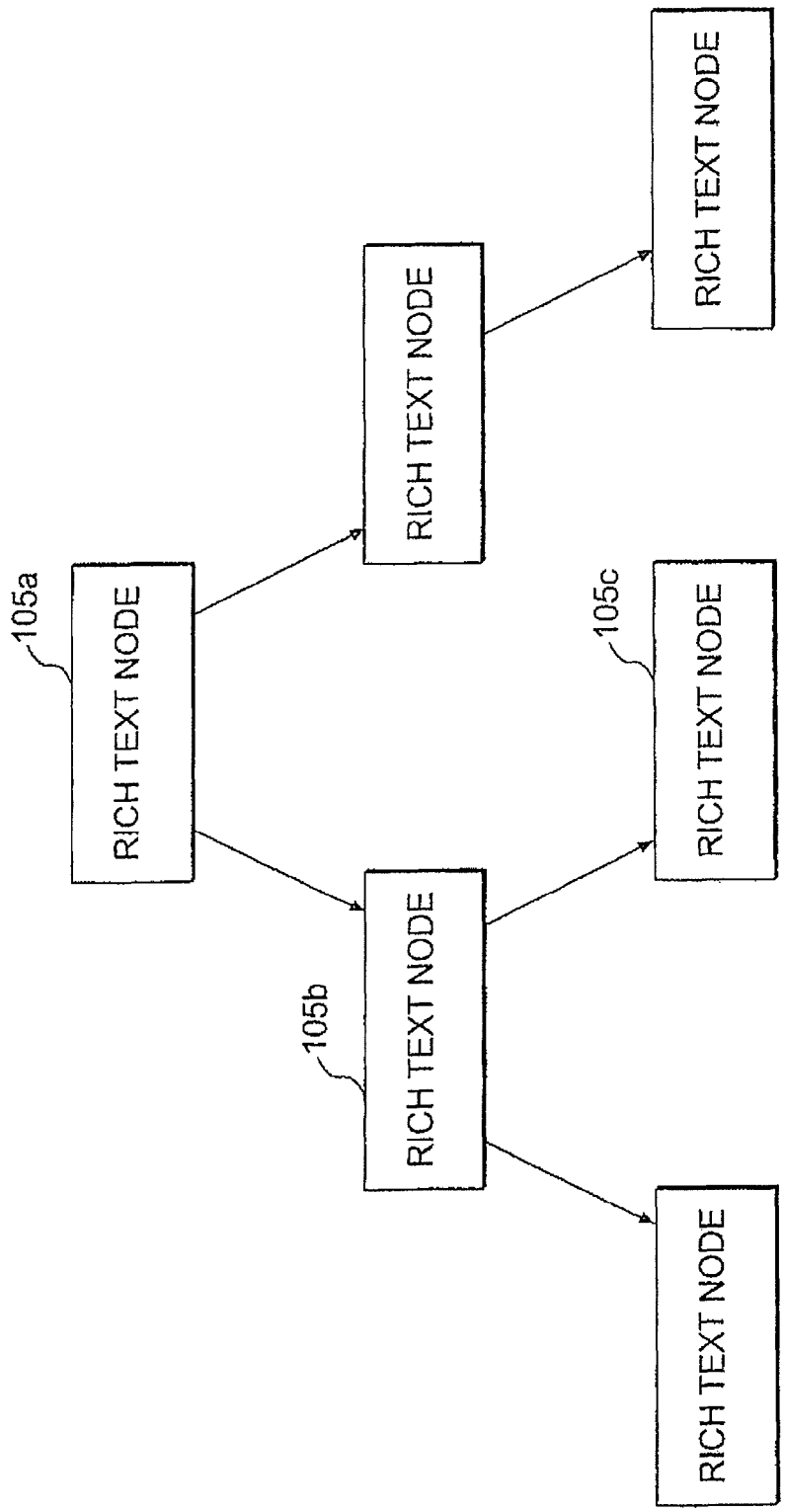
FIG. 4 is a relational block diagram of rich text nodes according to the present invention.

In the latter scenario, two rich text nodes would be required to process these attributes. The parsing method for html handles this by creating a structure of rich text nodes using preceding and following node links as shown generally in FIG. 4. Depending on the actual html being parsed, this structure may be very elaborate and may include many children nodes. Three of these nodes 105a, 105b, and 105c are arbitrarily chosen to further illustrate creation of memory structures from html in FIG. 4.

Figure 5:
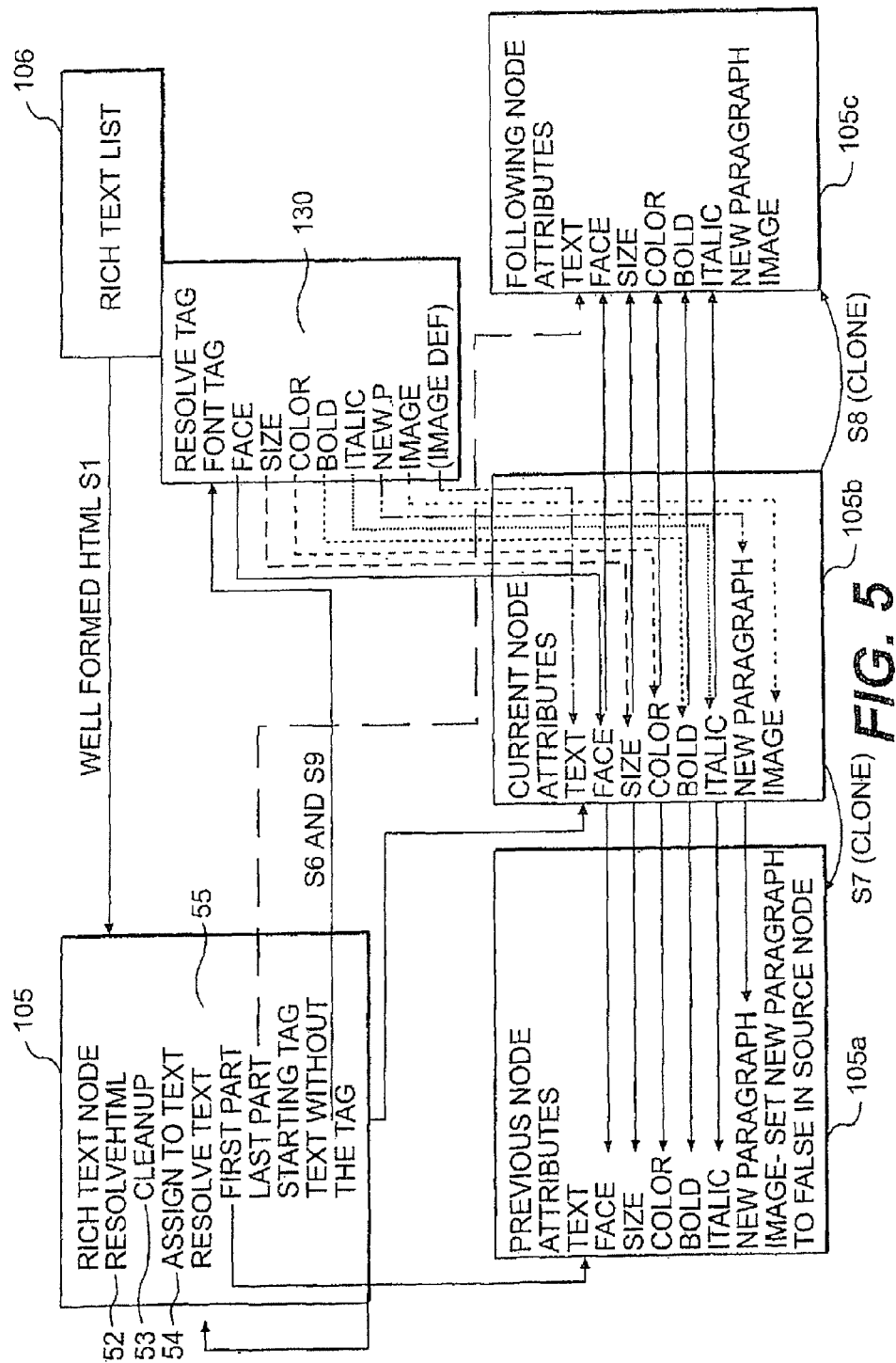
FIG. 5 is a functional block diagram showing steps and components involved in creating various types of rich text nodes according to the present invention.

Referring now to FIG. 5, a block diagram showing steps and components involved in creating various types of rich texts nodes is shown according to the present invention. It should be well understood that the block diagram of FIG. 5 (and FIGS. 6 and 7) may represent a structure of the present invention, as well as a high level flow diagram showing the steps implementing the present invention. The steps are denoted by each of the structural blocks or within the structural blocks, and may be implemented using a plurality of separate dedicated or programmable integrated or other electronic circuits or devices. A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention. The steps may equally be implemented on any known medium.

In FIG. 5, the current node 105b reflects the current attributes of rich text node 105. The rich text list 106 passes, at step S1, well-formed segments of html to the rich text node 105. (The overall operation of the rich text list 106 will be described in more detail below). Also, the steps of the parsing method of rich text node 105 are shown in relation to the preceding and following nodes which are now produced. Once the html is resolved at step S2, the rich text node 105 performs some cleanup, as needed, on the passed html it has been asked to parse as shown at step S3. At step S4, the unparsed html is assigned to the text attribute of the rich text node. The parsing method of rich text node 105 then calls resolveText method at step S5 to parse the html. The resolve text method of step S5 extracts tag information from the text attribute, then uses that tag information to set the other attributes in the rich text node by calling the resolveTag method 130, shown as step S6, and then sets the text to the text it parsed without the tag it just extracted. The steps of the resolveTag method 130 includes the following:

1. Read the text up to the first tag (i.e., the first occurrence of "<"). If this is not a null string, clone the current rich text node 105b and make the clone a preceding node 105a (S7), and assign to it all the text before the first tag (i.e., first part). Then remove that part of the text and call the resolvetag method 130 again. The html needs to be well formed for the cloning steps to work recursively. The well formed property ensures that the encountered tags are in the proper order so that the text sent to the clone will not miss any tags.

2. If the tag has a matching end tag, check if there is any text beyond that end tag. If there is, clone the current rich text node 150*b*, make that clone the following node 105*c* (S8), and assign it the text after the end tag. Then remove that part of the text and call the resolveTag method 130 again.

3. If the tag is an image or link tag, clone the current rich text node 105*b* and make that clone the following node 105*c* (S8), and assign it the text after the tag (i.e., last part).

4. Pass the tag information (the text between the "<" and ">") to resolve the tag and to set up the tag attributes, shown at step S9. If this is an image or link tag, it requires that the attributes are stored in the text. This is the reason for moving the original text to the following node.

5. If the preceding or following nodes are not null, call resolve tag 130 on them, making the preceding or following node (as appropriate) the current node, which recursively propagates more rich text nodes as necessary to fully represent the rich text.

The resolvetag method 130 is relatively straightforward, except for the image tags. For other tag types, the resolveTag method 130 may determine the type of the tag, for <i>, <strong>, <u>, <p>, or <br> it simply sets "on" the corresponding boolean attribute. For font tags, the content of the tag is parsed to determine if it has size, face or color information, and these attributes are set accordingly if they have been specified. Image tags are somewhat more complicated because the rich text editor overloads the file name with other information to set the alt tag, the height, the width, whether the image should float and whether the tag is to be treated as an in-line image, file attachment, or link. If the image size is manipulated within a rich text editor, the browser generates back the resized image with the height and width in a style statement instead of as html tag attributes. A style tag is generated with the float definition. All of this is written to the text attribute of the rich text node (each image tag requires its own rich text node). If the image is defined as a link instead of an image, the full link tag (e.g., <a href= . . . > . . . </a>) is placed in the text field.

Figure 6:
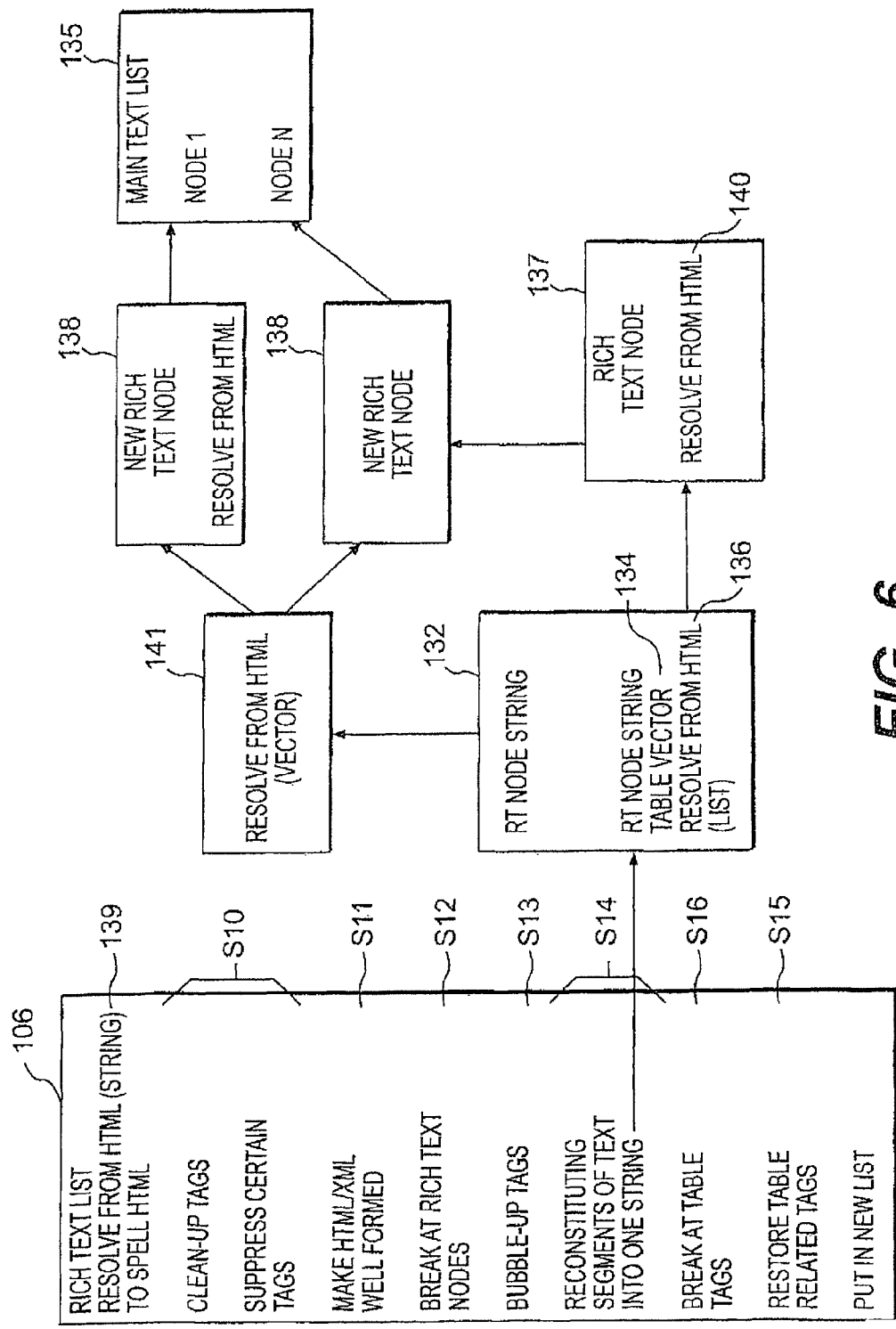
FIG. 6 is a functional block diagram showing steps to process a rich text list.

FIG. 6 shows a block diagram including different structures or steps for processing a rich text list. The rich text list 106 may perform some preprocessing of the html before it passes well formed segments of html to the rich text nodes 105. In step S10, cleaning up the html by converting some substitution strings back to their original values, and suppressing meaningless tags such as </p> is provided. At step S11, html is well formed. If the html has previously passed through rich text processing (e.g., it was generated from a rich text list at one point and then modified by a rich text editor), it will have markers where the rich text nodes were broken out the last time through (these are separated by a <!% TT %-> comment tag). The incoming text is broken at these markers at step S12. While this process makes it more efficient to process html, during rich text editing for example, it is not strictly necessary. It is understood that a parser is capable of handling large chunks of raw html such as would be encountered during conversions from another source, or if a rich text was pasted into the rich text editor.

Still referring to FIG. 6, within each segment html, tags that are not of interest at this point are buffered at step S13 by changing the start end and end brackets to substitution strings. This includes a table and list related tags, which are ignored now and restored later. At step S13, a check is also made to ensure that the tags start and end in the proper order, and each start tag has a matching end tag within the segment. This is performed by bubbling up end tags that do not have matches within that segment, and then eliminating pairs of start and end tags that have no intervening content. At step S14, the segments are reconstituted into one string, again using the rich text node separator.

At step S15, the table related tags are restored which where ignored previously. At step S16, the html is broken into segments at the <table> tags, and then organized into a new rich text list 132 that includes entries that are either simple strings 133 (for rich text node entries) or vectors 134 (for table entries). The list version of resolveFromHtml method 136 is called to process this list. For the string entries, the resolveFromHtml method 136 for the rich text node 106 is called. These nodes may be added directly to the list of rich text nodes attached to the main rich text list 135. For the vector entries, the resolveFromHtml method 140 for that table node 137 creates a new rich text node 138 in the next position in its main rich text list 135, passing the vector that has the table information.

Figure 7:
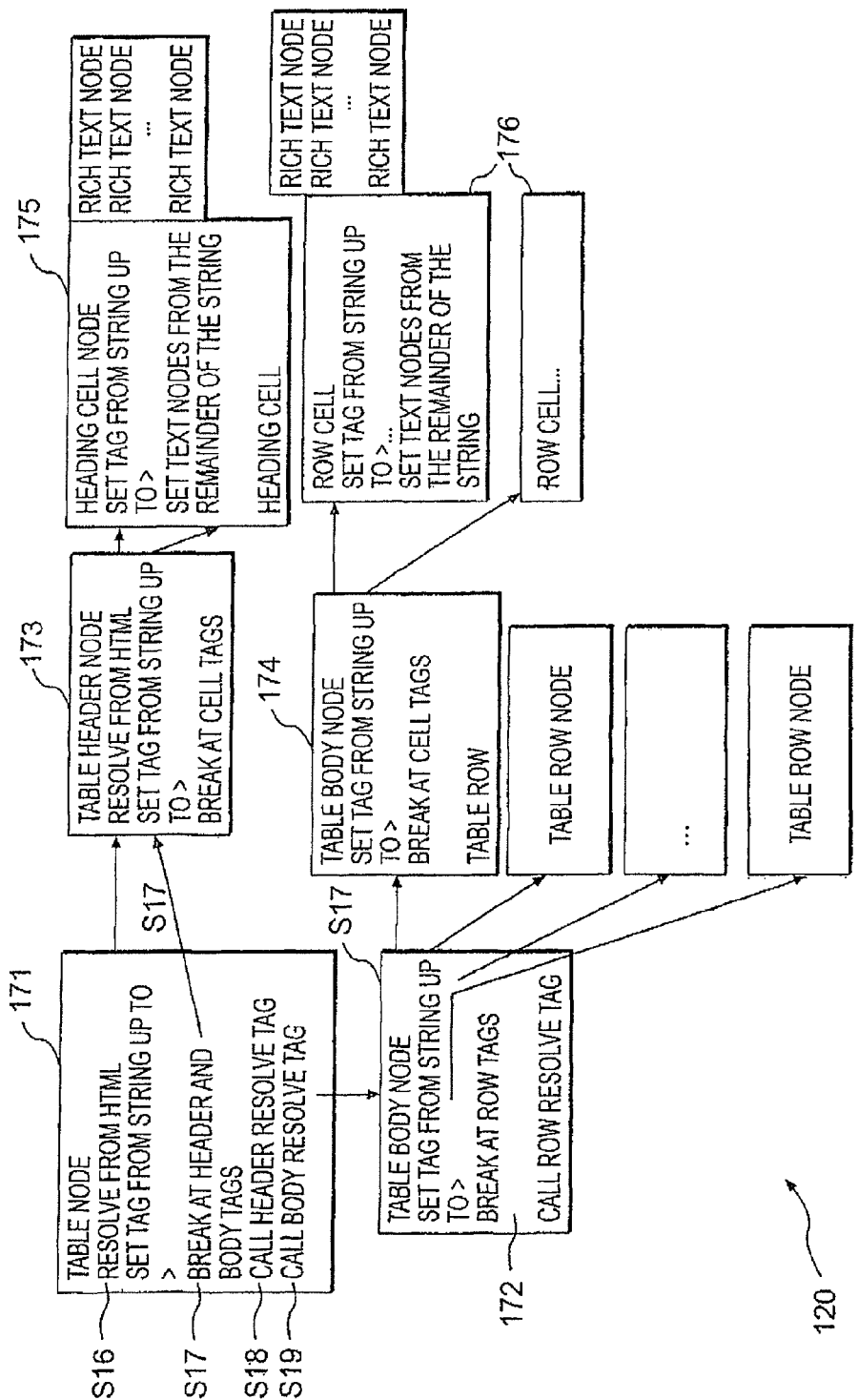
FIG. 7 is a functional block diagram showing steps and results of processing a table node according to the present invention.

FIG. 7 is a block diagram showing steps and results of processing a table node. The table structure is again generally shown as 120, and is built in memory by successively resolving the tags through each type of table node, i.e., table header node 170 or table body node 172. The operations of table node 171 are essentially repeated by any succeeding table node type created by table node 171, substantially a recursive operation. The table node 171 reads the incoming tag up to the first end tag (>) to strip out its own tag information at step S16, then splits the rest at the next tag type, and passes each entry to that type of table node, either table header node 173 or table body node 172. For each table node created, the appropriate resolveFromHtml method is iteratively called to continue processing. Table row nodes 174 and row cell nodes 176 are created from the table body node 172. Heading cell nodes 175 are created from the table header node 173. The cell type tag nodes (i.e., th and td nodes) receive html strings that contain source for rich text nodes. These are used to set up rich text lists attached to the cell nodes.

Converting the Rich Text Memory Structure into html

Figure 8:
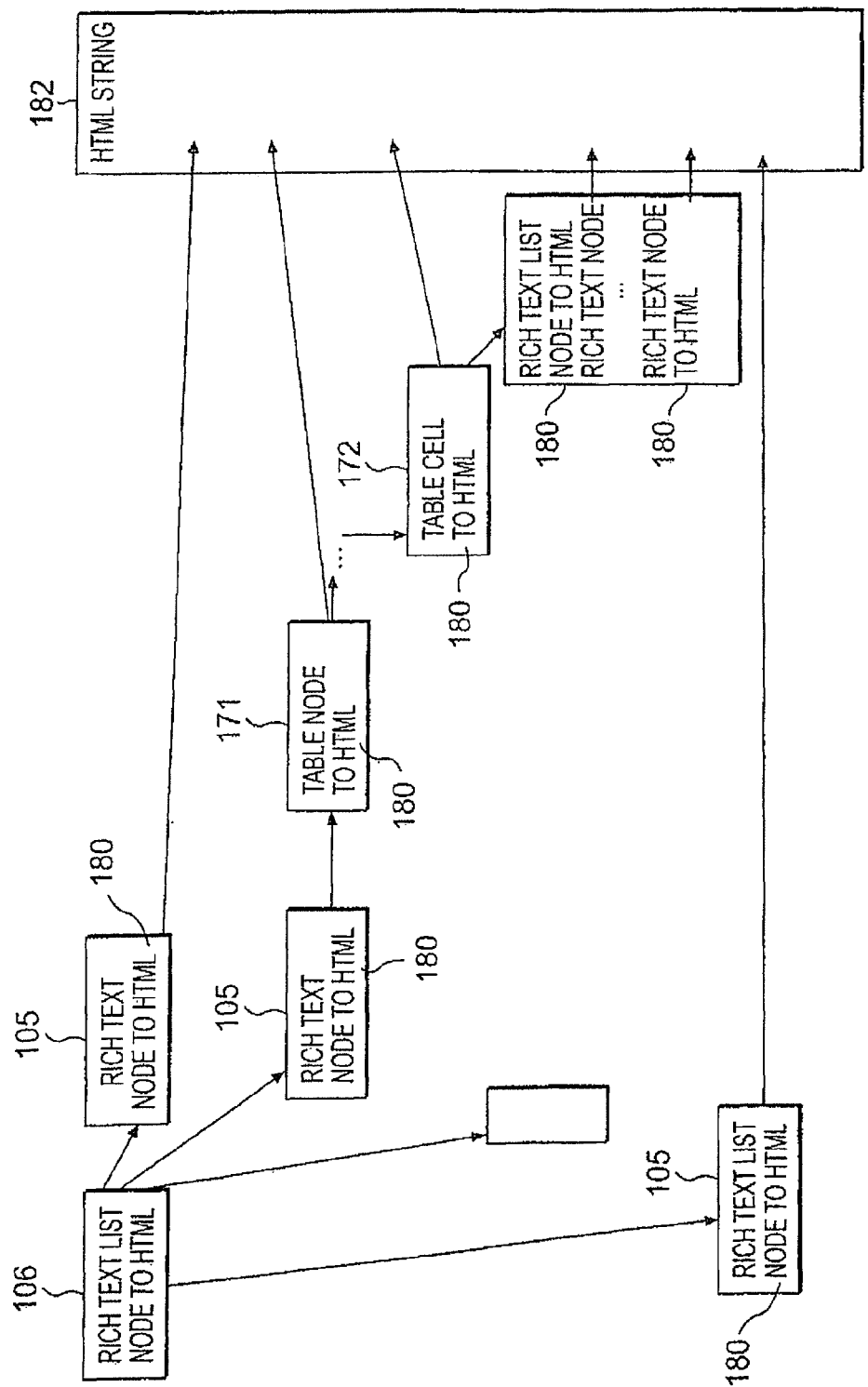
FIG. 8 is a functional block diagram showing the results of processing a rich text list according to the present invention.

FIG. 8 shows a block diagram showing the results of processing a rich text list. Once a memory structure has been created representative of html, regenerating html from these structures can be accomplished by utilizing a toHtml method associated with each node in the memory structure. The toHtml method 180 is used by each node in the memory structure to write out its part of the total html based on information in that node, i.e., it renders rich text as html for use by a browser or the like. The rich text list 106 calls this method on its main list of rich text nodes 105 and processes them in order. If any rich text node 105 has a table node 171, it calls the toHtml method for that table node (so that the html for that table is added to the resulting html string 182 before the next node in the main rich text list 106 is added). Each node (e.g., 171 and 172) in the table structure adds its own tag information to the resulting html and then calls the toHtml method 180 for each of its dependent tags. This process continues until all nodes have been processed.

Representing the Rich Text Structure in a Relational Database

Rich text is stored as a string in a relational database. Because of the potentially large size of this string, it may be stored in a CLOB column. In order to make this as compact as possible, and to reduce the amount of tag information stored as text (this is to make searching less confusing), most of the tag information in each rich text node may be stored in a compressed format. Arrays are kept of the permitted font face and color values, and the index for those entries is stored into the array. Also, other attributes such as bold, italic, underline and whether the rich text node is an image tag are boolean attributes, and what is stored from them is a null string for false and a one byte string for true. The table nodes are stored in their html tag format, except that the cell nodes may use the relational format for their rich text nodes.

Databody fields can be stored in string, date, or numeric format and comprehensively represent the document contents. Rich text is an added type for the databody field that is stored in string format. An aggregate editor, which is capable of manipulating and editing a databody, recognizes the rich text type, and has a rich text list as one of its attributes to hold the memory representation of the rich text. This is converted into the string format for the relational database and assigned to the column that holds string values.

Retrieving the Rich Text Structure from a Relational Database

Figure 9:
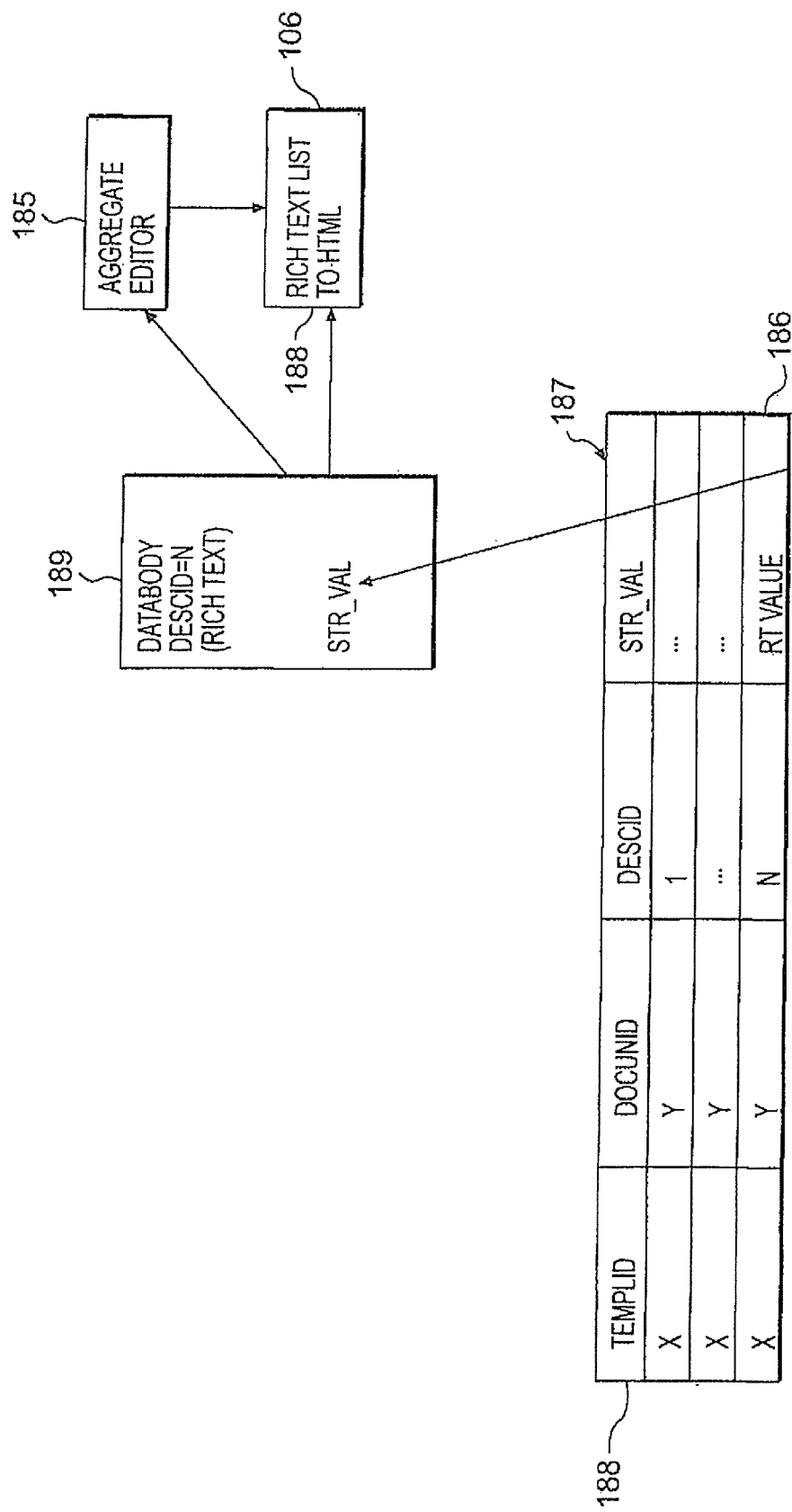
FIG. 9 is a block diagram showing components involved in processing a databody with rich text using an aggregate editor according to the present invention.

FIG. 9 is a block diagram showing components involved in processing a databody with rich text using an aggregate editor according to the present invention. Once the rich text structure is stored in a relational database according to aspects of the invention, it is retrievable for use such as editing and updating. If a databody field (e.g., 186) is defined as rich text, an aggregate editor 185 may retrieve the rich text string 186 from the column for string values 187 in the relational database 188 and convert that string into memory representation 189 using a toDb2 method 188 in its rich text list attribute. The toDb2 method 188 follows the same pattern as the toHtml method 180 described previously. A difference is that the string may be split into rich text nodes, so that the toDb2 method 188 for each rich text node 105 does a simple conversion of its portion of the string into corresponding attributes.

A particular consideration is the presentation of image tags that are BLOB references. These are modified to assure that the URL for the servlet is the current one. This is done in the memory representation of the rich text list. Each of its rich text nodes is checked to see if it is an image node representing a BLOB reference, and if so, the servlet portion of the URL is modified to match the current URL.

Presenting Rich Text for Editing Over the Web

Figure 10:
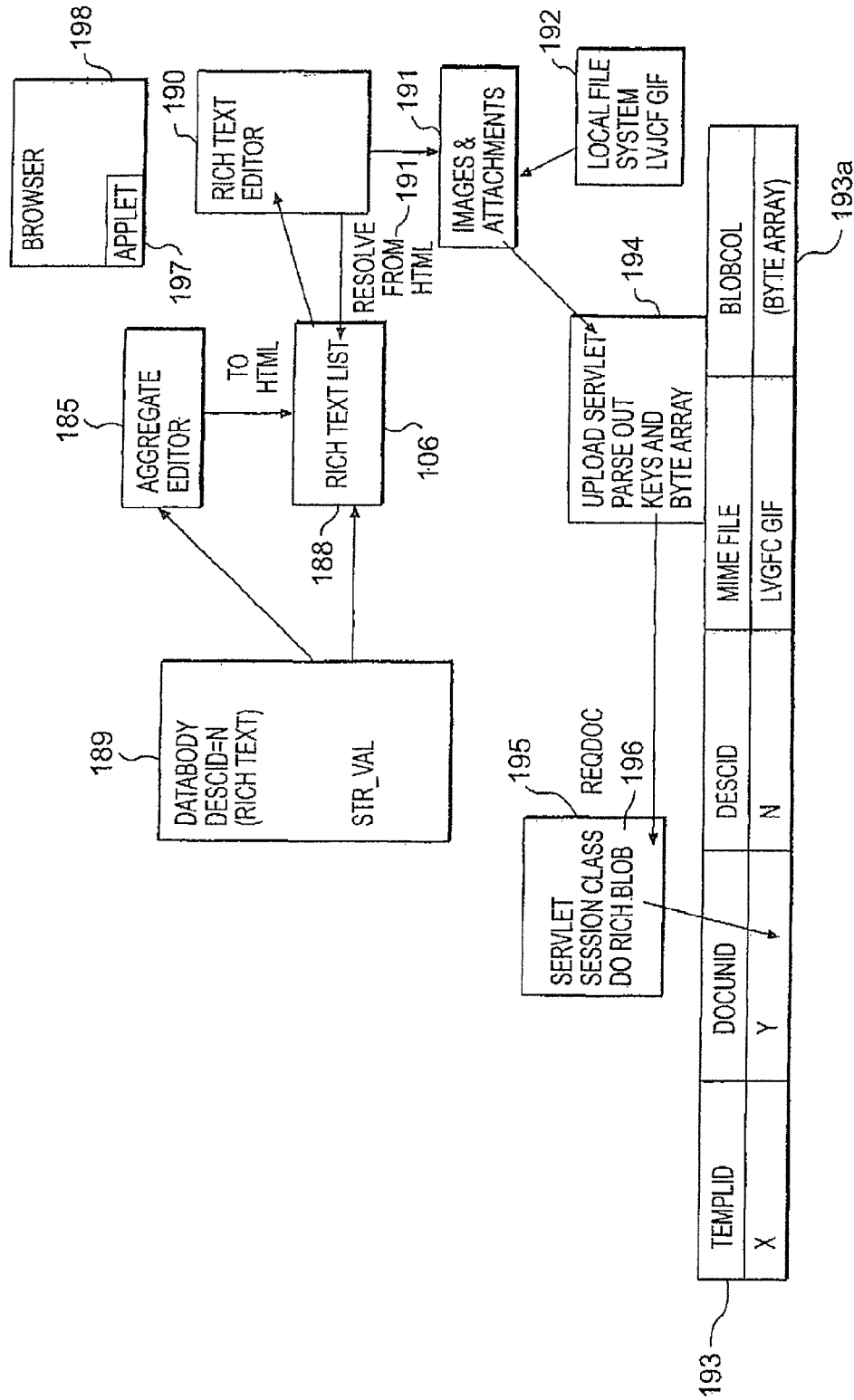
FIG. 10 is a relational block diagram showing the relationship of components in editing a databody, images or attachments by an aggregate editor and a rich text editor with a browser according to the present invention.

FIG. 10 is a relational block diagram showing the relationship of components in editing a databody and the like with a browser according to the present invention. In FIG. 10, if the type of a databody field (e.g., 193a) is rich text, then when a document is presented in edit mode using a rich text editor 190, that field is presented as read-only with a link above it so that when clicked by a user allows editing of the field. The link may be to a JAVASCRIPT method that brings up a rich text-editing window (i.e., a new browser window). This new window includes hidden html fields (i.e., hidden input fields) which contain the keys needed to process the field when edited (i.e., session key, manager key for the databody application class, row number of that databody field within the databody lists, etc.). This new window also passes the rich text converted into html using a resolveFromHtml method 191 for the rich text list attribute of the databody aggregate editor 185 rich text list 106. The rich text editor 190 may retrieve any images or attachments 191 from a database, shown in part, as a database row 193, using the servlet class doRichBlob 196 where the servlet is uploaded for parsing out of keys, byte array, etc.

In one type of the Web browser 198, the html for the rich text is assigned to a "content editable div" which allows the text to be edited directly. The rich text edit window is a somewhat simple html form. For other browsers 198 that do not provide native support for rich text edit, the rich text edit window is a frame. The frame includes two parts, as shown in FIG. 11D, one to edit the rich text as plain text, i.e., frame 210, using an applet 197, and a second frame, i.e., frame 211, to display the resulting rich text as it is edited. The same applet 197 may be used with known editors, but, in embodiments, may remain hidden. Applets are typically client-side JAVA programs that are loaded and run within the framework of a Web browser.

The applet 197 may be linked to the html edit window using the feature of JAVASCRIPT. In one browser version, each of the rich text editing functions 208 may call a JAVASCRIPT routine that invokes a function for rich text manipulation, and then passes the revised html to the applet 197. The applet 197 then processes the html, and writes the output back out to the "content editable div." At its simplest, the applet 197 uses the html to create a rich text list structure in its memory, and then converts that rich text structure back into html. This cleans up the html and makes it well formed. In the case of image tags inserted into the rich text by the rich text editor 190, the applet 197 does a great deal more.

There are several functions in the EADP rich text classes to support the plain text editing of the rich text. One is a method on all the rich text nodes to render them into plain text. When a simple rich text node is rendered to plain text, its text is written to the output string, along with a one byte separator (a non-editable break character). The latter serves as a reminder that the plain text is really a representation of rich text, and also makes it easier to parse updates to the plain text representation to render it back into rich text. If the rich text node is an image node it reports itself in the plain text representation as an image or link. If it is the anchor point of a table node, it reports itself as a table. Note that the content of the table consists of titles and data cells, which are themselves rich text nodes, so it is possible to edit the table by editing its plain text representation.

Figure 11B:
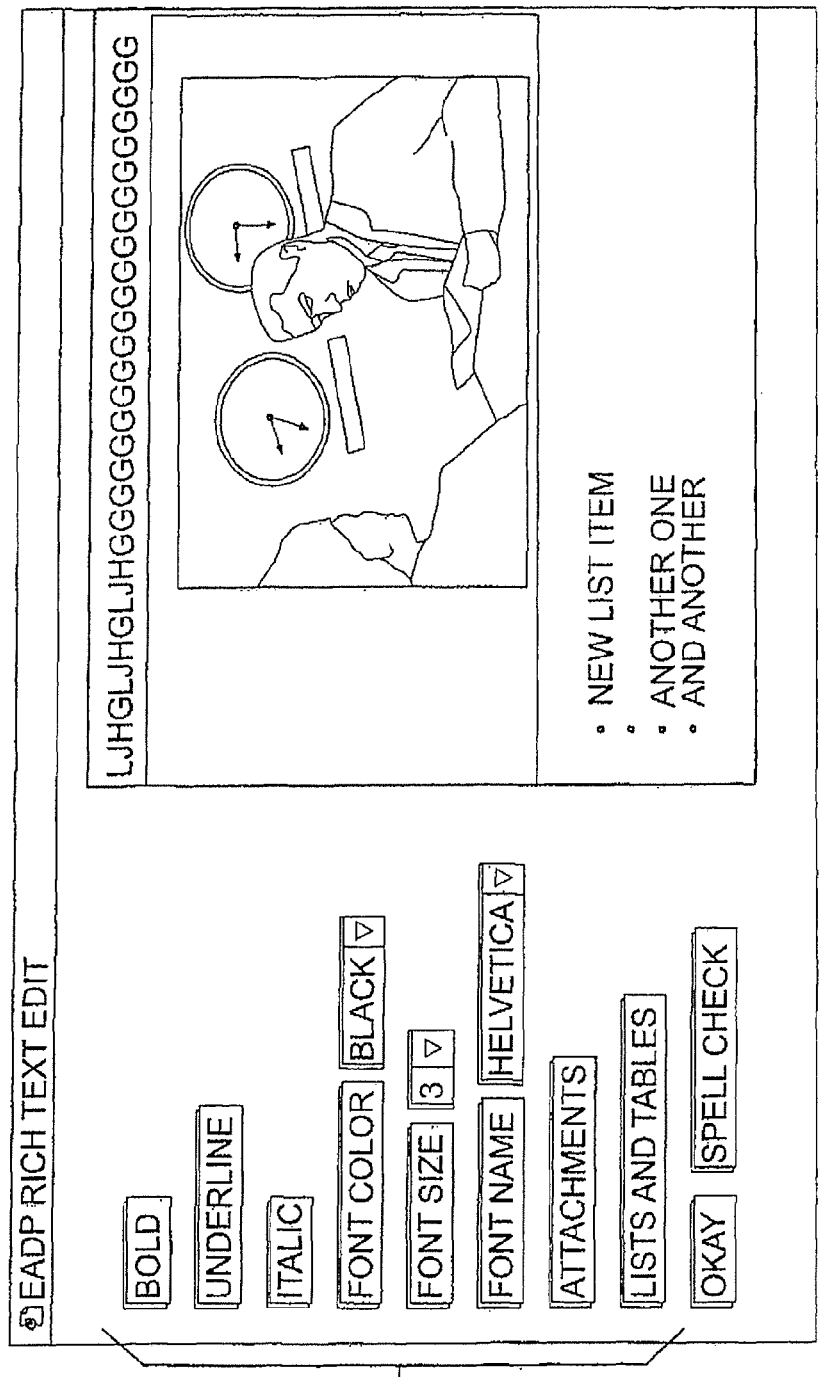
FIG. 11B is an example of an edit screen and controls according to FIG. 11A.
Figure 11D:
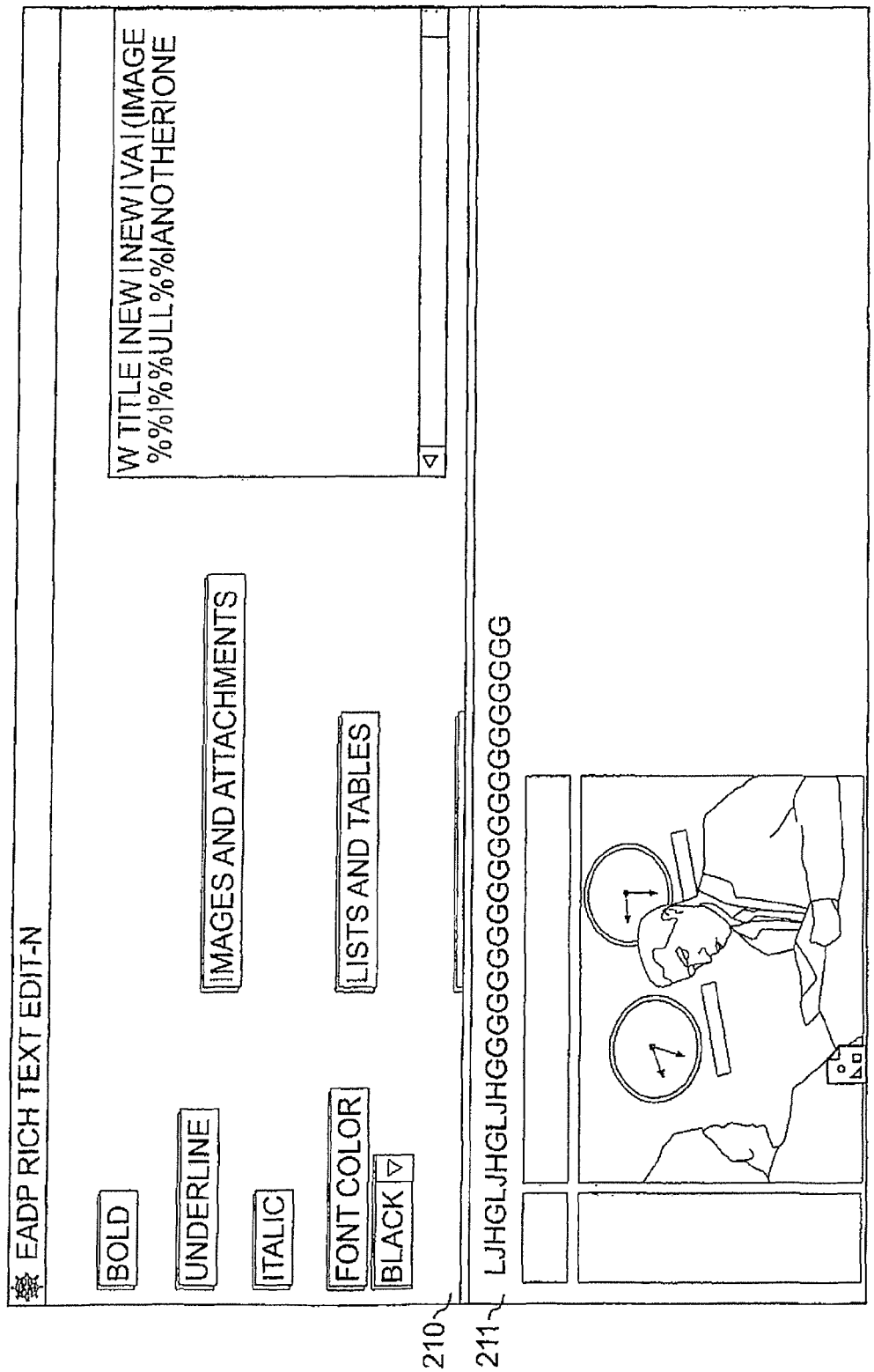
FIG. 11D is an example of a browser screen for editing rich text with a browser according to the present invention.

FIGS. 11A-11D illustrate screen shot examples of rich text in browse and edit mode. FIGS. 1B-11D show screen shots in edit mode showing various edit selections 208 including in the body of the browser (FIG. 11B) and a tool bar (FIG. 11C). Another feature of the present invention is the ability to determine cursor position and selected text within the rich text node. The text area in the applet 197 is able to report the cursor position and the start and end of selected text in the plain text representation. This is then interpreted to determine which parts of text and in which rich text nodes have been selected. Since text selection is typically related to a change in font characteristics, the text node may need to be split to allow the change in face size or color. Each keystroke event in the plain text area is intercepted, and the plain text is written back into rich text in the area on the bottom of the frame. If table, lists, or file attachments are chosen, an image tag is generated to mimic what happens in a certain editor, and it may be inserted at the current cursor position.

Handling Tables, Lists, Images and File Attachments During Rich Text Editing and Presentations When editing rich text and presentations using a browser, the memory structures and mechanisms to manage the representations of the rich text are consistently maintained as described above in order to provide overall controls for the editing operation. Examples of browser presentations and rich text editing options, illustrating the relationship between user interaction via a browser and the memory structures, are expanded further in conjunction with FIGS. 11A through 14B.

Rich text editing functions of some browsers implementing the present invention, provide two basic types of functions. The first is a variety of ways to change the font and text characteristics (this includes font face, font size, font color, bold, italic, and underlining). The second is the ability to insert an image at the current cursor position by specifying the local file name for that image. The third is the ability to indicate selected text through use of the insert link tag by specifying a special URL for the link that indicates the advanced function to perform. The advanced features of the rich text edit function are built on extensions of the image and link tag facilities. The native function of the browser may be used to create an image or link tag with a file name or URL that is overloaded with additional parameters. This is then intercepted by JAVASCRIPT functions or the hidden applet 197, and used to provide additional features.

Figure 12A:
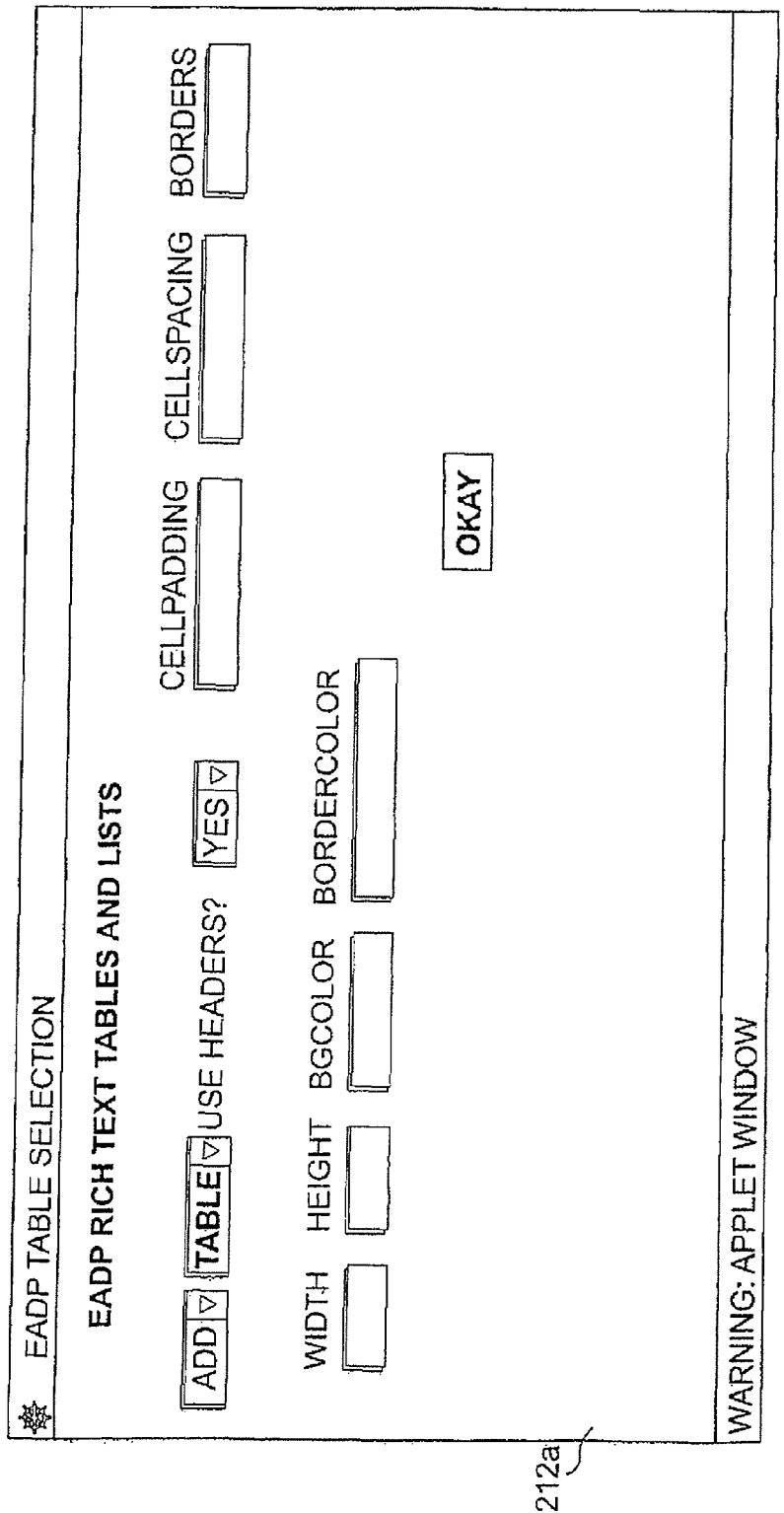
FIG. 12A is an example of editing rich text tables and lists according to the present invention.
Figure 12B:
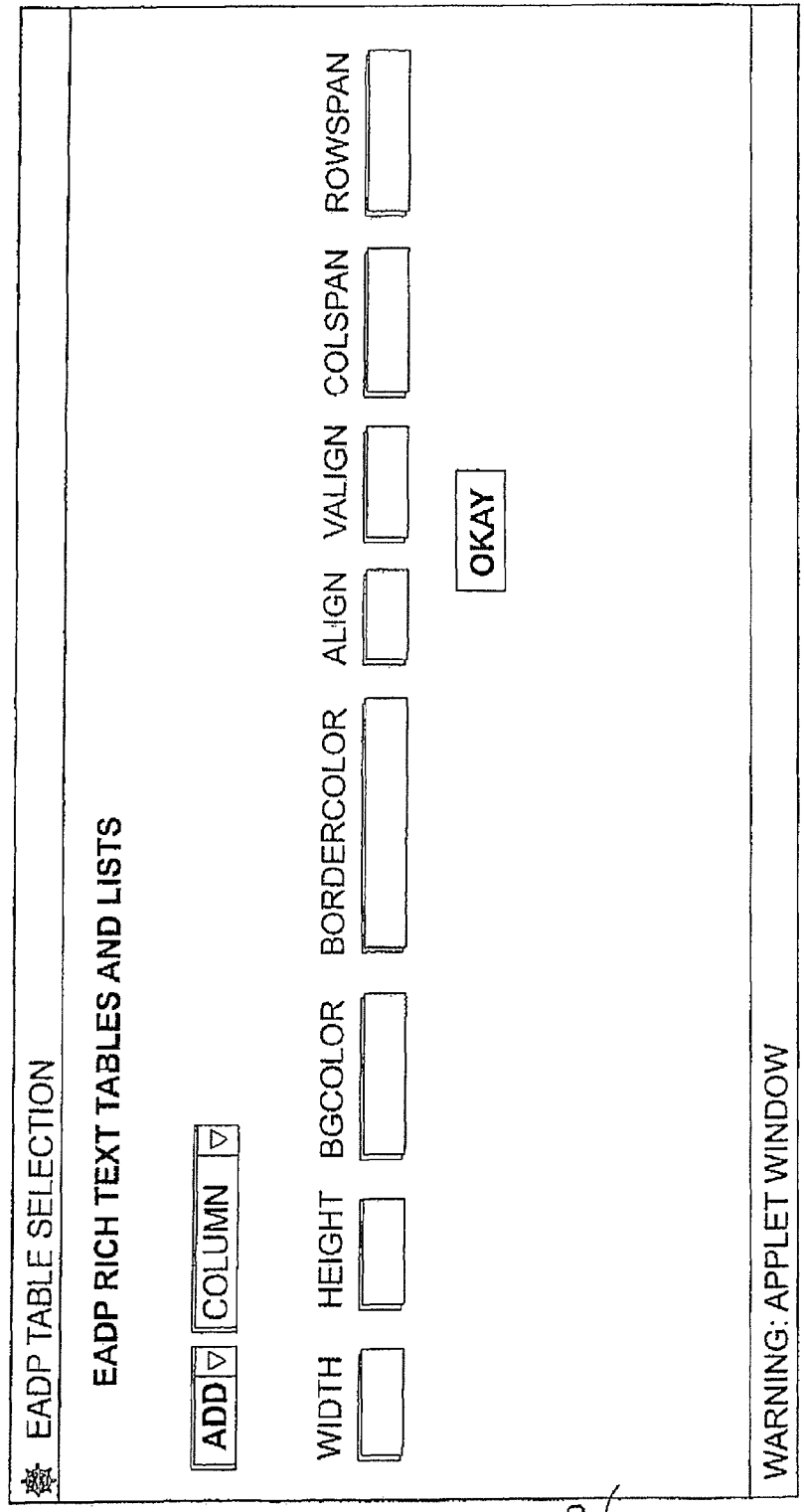
FIG. 12B is an another example of editing rich text tables and lists according to the present invention.

One example of this is the way EADP-based rich text editing of the present invention allows insertion of table structures and lists into the rich text area. The button labeled "ListsAndTables" (FIG. 11B) (or the equivalent icons) invokes the image insertion function in the browser, but with a file name of "table". When the hidden applet 197 intercepts the generated html, it first creates a rich text structure from the passed html, and then looks for an image tag with file name of "table." If one exists, it brings up a frame (or panel) 212a and 212b that allows creation of tables and lists as shown in FIGS. 12A and 12B. The options available from these frames 212a and 212b depend on where in the rich text it is invoked. If it is invoked from an area of regular text the only options are to create a new table or list, as shown in FIG. 12A, frame 212a. If it is invoked from within an existing table, there are options to add or modify columns, rows, and headers, as shown in FIG. 12B, frame 212b. As can be seen, depending on which type of table element is chosen, the elements that can be specified change accordingly. When a selection and update is made in this frame, the applet 197 then uses the information to add or update a table node or list entry in its rich text structure in memory. This is then converted back into html and written back out to the rich text display area.

Figure 13A:
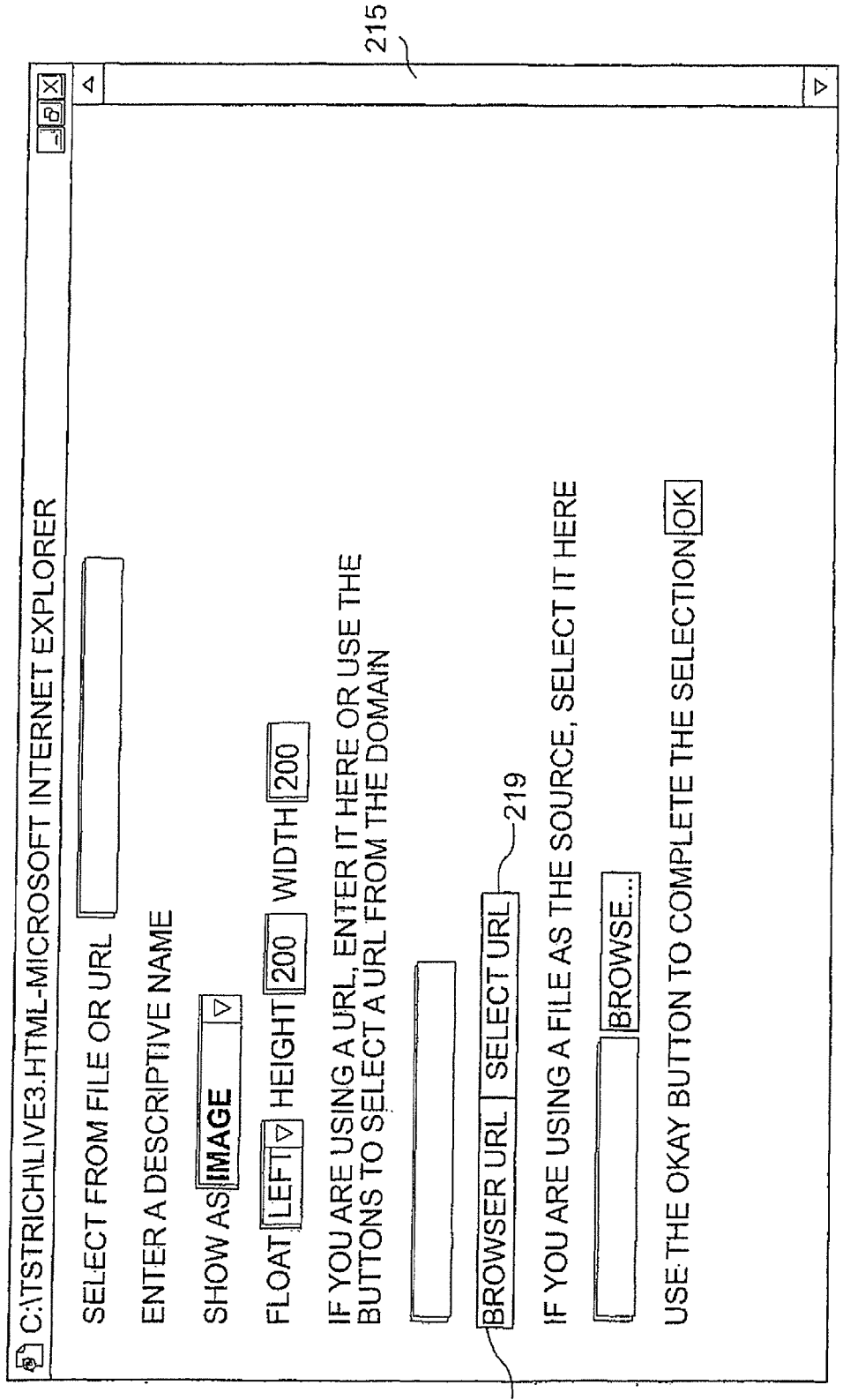
FIG. 13A is an example of editing rich text to select or browse a URL according to the present invention.
Figure 13B:
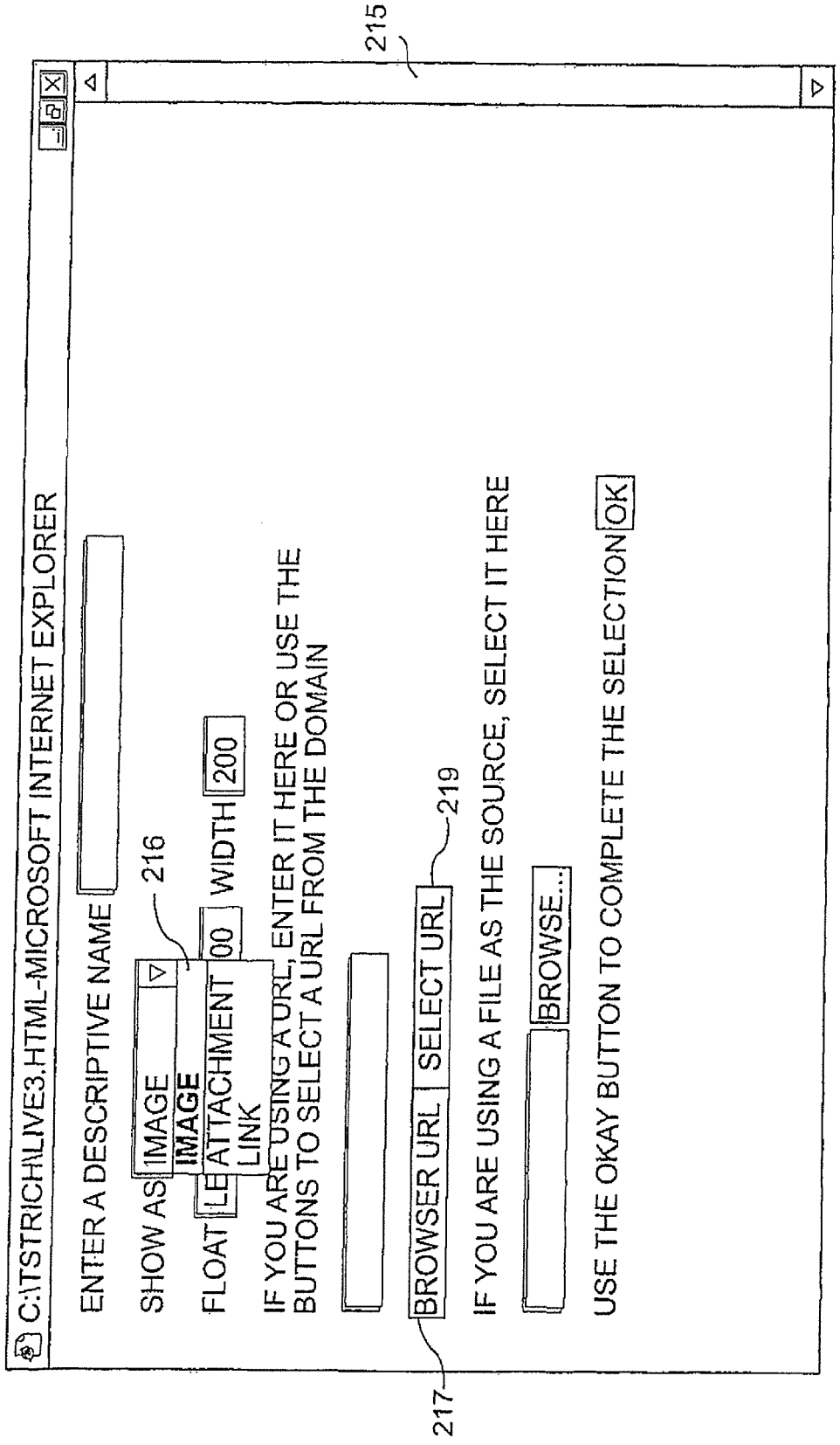
FIG. 13B is an example of editing rich text for images, attachments, or links according to the present invention.

Referring now to FIGS. 13A and 13B, when the "Attachments" button 216 of FIG. 13B (or equivalent icon) is pressed, this invokes a JAVASCRIPT function that brings up a new html window (panel) 215 to process images, attachments, and links. This panel 215 allows selection of whether to process the file or URL as an image, attachment, or link as shown by 216. The source can be either a local file or an existing URL. For URLs, a new html window is opened (not shown) to allow selection of the URL when the Browse URL button 217 is pressed.

The file button 218 (FIG. 11A) on the browser tool bar invokes the standard input of type file provided by all Web browsers. This allows the file contents to be uploaded to the server. When this html window 215 is opened, the keys to the current text being edited are added as hidden input fields (e.g., the session key, the manager key, and the databody row number). If a local file is chosen, this information along with the file name is used to create a new entry for the file contents in the BLOB table in the relational database on the supporting server. This data is uploaded and stored immediately to avoid problems in a clustered server environment (i.e., it is typically too expensive in a clustered environment to attempt to try to store the BLOB contents in session memory). If a URL (e.g., Select URL button 219) is chosen as the source, there is no need to upload the data.

This panel 215 allows the addition of a great deal more formatting of data for the image or attachment. This includes aspects that are needed for well formed and accessible html such as the alt tag, the size of the image, and whether it should float. All this may be added to the file name that is assigned to the image tag. When the OK button is pressed, the file is uploaded if need be, and the image creation function on the parent panel is called. This adds the image tag with the overloaded file name to the html, and invokes the applet 197 to intercept and resolve the html. The applet 197 then creates the rich text structure in memory from the passed html. When it processes each image tag, it resolves the file name by parsing out any information that was added as an overload. This additional information is used to set additional parameters in the image tag, to change the image tag to represent a file attachment, or to indicate that the image tag should write itself out as a simple link, for example.

Providing Spell Checking

As a convenient feature during rich text editing, spell-checking operations is provided in the various embodiments of the present invention. The spell checking solution is optimized for use within a servlet environment. Servlets are typically server-side JAVA programs that are loaded and run within the framework of a web server. The dictionary functions all reside, preferably, on the server side, and reside as singletons in server memory so that they are extremely fast. The returned html includes all misspelled words and possible replacements so that JAVASCRIPT functions on the client side can provide an interactive and responsive spelling correction. The technique for dictionary creation and usage is also unique to this invention.

The spelling dictionary may be created initially from word lists then instantiated and serialized. The serialized hashtable is held as property files in the JAVA code for the EADP (or equivalent) dictionary class (e.g., EADPSpellCheckController). The structure of the dictionary is a hashtable, where the entries are lists of words. The keys to these entries are unique and provide powerful search ability. In embodiments, each word is assigned a set of characteristic signatures. These characteristics can be simplified or enriched depending on the capabilities of the server holding the dictionary. The possible sets of signatures are:

1. If the word length is less than three, the only signature is the word itself.

2. If the word is greater than eight, one signature is the first half of the word.

3. If the word length is greater than seven, the first three and last three characters are signatures.

4. If the word length is between four and seven, the first two and last two characters are signatures.

5. If the word length is greater than four, the first four and the last four characters are signatures.

6. If the word length equals four the first two characters plus the last character is a signature.

7. If the word length equals four, the first letter plus the last two letters is a signature.

The signatures can be enhanced on more powerful servers. It should be understood that each word may be added to the list keyed by each of its signatures. Also, each word has a primary signature, its first three or four letters (or the entire word if it is short). A word is checked for correctness initially by determining if it is a member of the word list for its primary signature. If a word is not correctly spelled, replacements are determined by using all its signatures to find the words in the list for those signatures.

When a word is checked for correctness, it is first checked to see if it is present in the list for its primary signature. If it is not there, then it is not spelled correctly. In this case, a substitution list is created for the word. That consists of creating a set of signatures for the misspelled word, finding all the words in the lists keyed by those signatures, and then selecting the twenty best matches (ranked as described next) to the word in question.

The ranking is accomplished by creating a common list of all the potential replacements. Each word only appears once in the common list, although it may have been found in more than one on the signature lists. Each word gets a score representing how many times it appeared on a signature list.

The top fifty (or other predetermined number) matches are selected based on this score. This is done by adding all words with a score of eight to the list of fifty, then all the ones with a score of seven and so on until fifty words are on the top fifty list. A consideration is made that if the match score is less than three, an additional criterion (e.g., whether the length of the replacement word is within two of the length of the misspelled word) is used for the selection.

The next filter is to find words in the top fifty list that match first or last parts of the misspelled word. The length to match starts at the length of the misspelled word minus one, and is successively decreased. At each stage, the words on the top fifty list that match for the length are added to the top twenty list, until it is filled. This provides a list of twenty (or possibly another size) replacements that has the most likely replacements at the top.

The EADPRichTextNode class includes a toSpellHtml method, which invokes the dictionary function for each word in its text attribute. If the node is an image tag or table anchor node, the toSpellHtml method returns the standard html for that node. The table nodes also have toSpellHtml methods that just invoke toHtml. The EADPRichTextList toSpellHtml method invokes the same method on each of its rich text nodes, which in turn cascade the method through the rich text structure. The resulting html string has the misspelled words and their replacements isolated by special separator tags. The font tags for the rich text node are repeated for each segment of text outside of the misspelled word.

Figure 14:
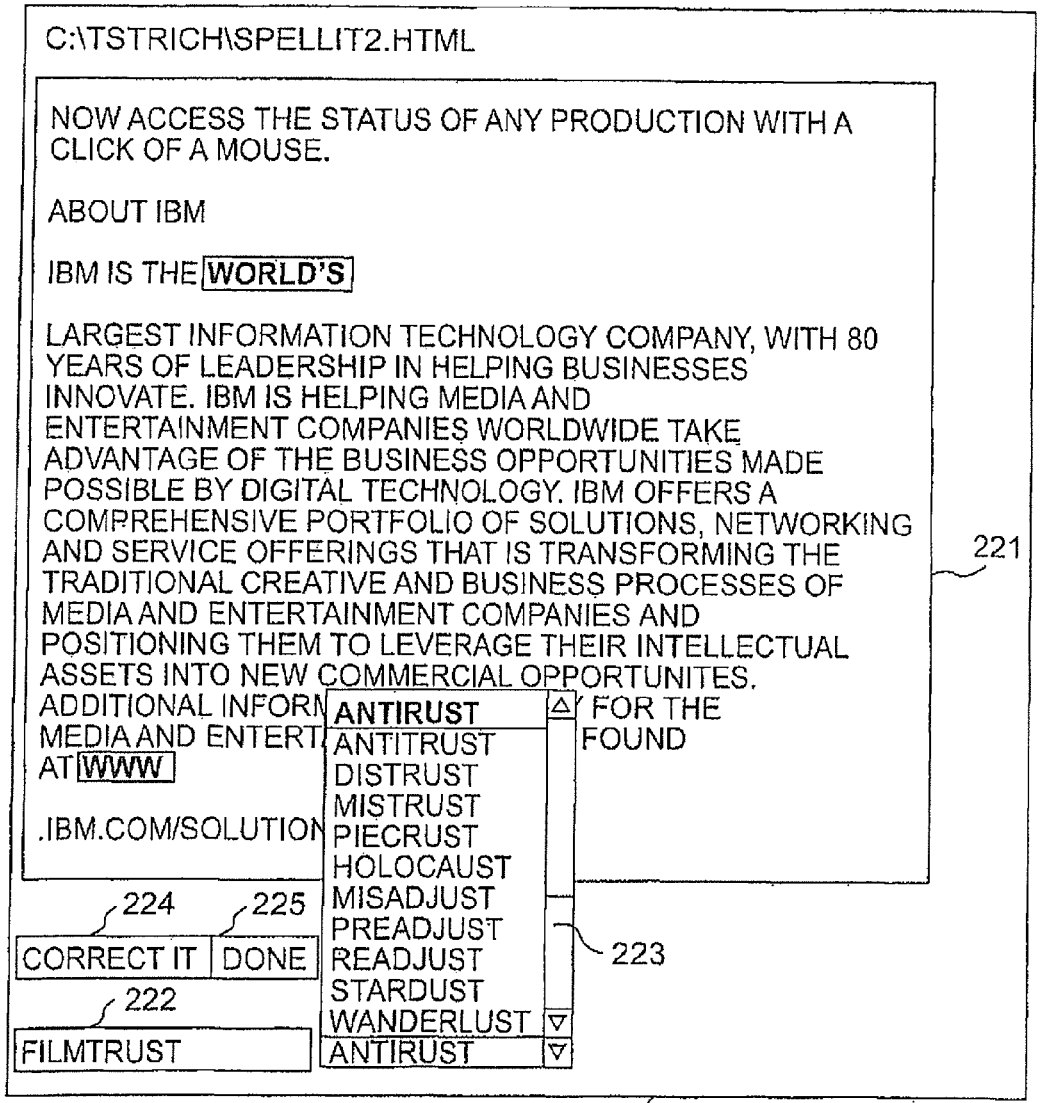
FIG. 14 shows a spelling check screen for determining replacement words in a rich text document.

When the spell check button (e.g., FIG. 11B) is pressed on the rich text edit panel, it submits a request to the server to convert the rich text to "spell html" format, and bring up the html for the spell check panel 220 of FIG. 14. The panel 220 is assigned the spell check version of the html as a hidden input field. The panel 220 has an area to display the rich text 221, a text area 222 to display the current misspelled word or its correction, an option list of possible corrections 223, and two buttons. The "Correct It" button 224 replaces the current misspelled word with whatever is in the text area (this could be the original spelling, a choice from the option list, or a manually typed in replacement) and moves on to the next word. The "Done" button 225 terminates spell check and moves back to the rich text edit panel.

Figure 18:
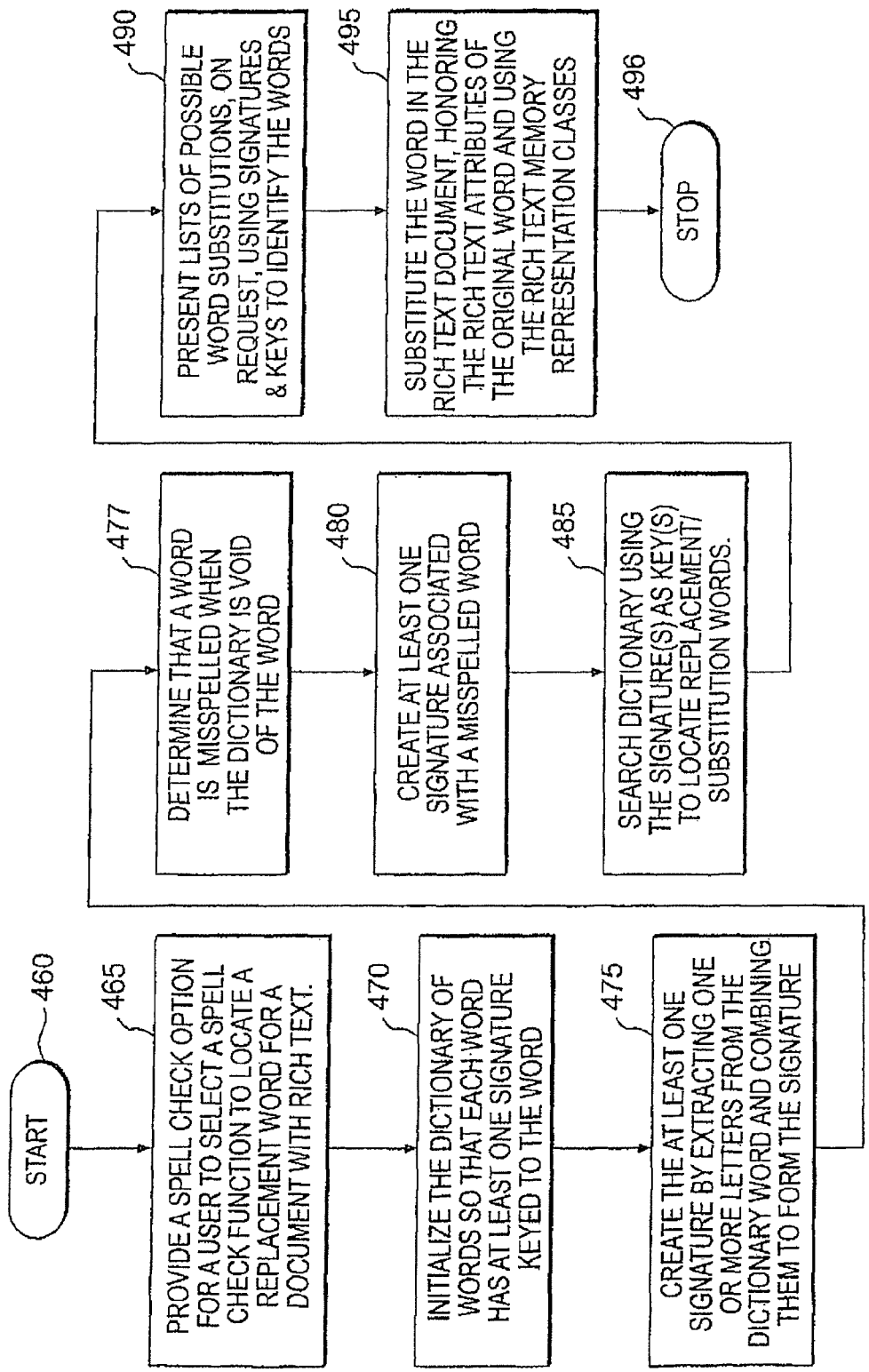
FIG. 18 is a flow diagram showing the steps of providing a spell check function for a rich text document according to the present invention.

FIG. 18, shows the steps of providing and using a spell check function for a rich text document that starts at step 460. At step 465, a spell check option is presented for a user to select a spell check function to locate a replacement word for a document with rich text. At step 470, either at the selection time of the spell option, or at another time, the dictionary is initialized so that each word in the dictionary has at least one signature to facilitate searching and retrieval of possible alternate substitutions for misspelled words. At step 475, creation of at least one signature for each word is accomplished by extracting one or more letters from the dictionary word and combining them to form the signature. This extraction and combination is performed according to the previously described alternatives. At step 477, a word of a document is determined not to be in the dictionary (i.e., void entry), then at step 480, at least one signature associated with the misspelled word is created so that at step 485, the dictionary can be searched using the signatures created in step 480, and are associated with the misspelled word, as keys to locate possible replacement or substitution word(s) in the dictionary. At step 490, one or more lists of possible word substitutions in reply to a prior request of the user are presented. At step 495, substitution of a word in the rich text document is performed while honoring the attributes of the original word that is replaced. This substitution is performed using classes and methods associated with the spell checker that makes use of, and is in harmony with, the rich text memory structure representation described previously. The process completes at step 496.

These features are not typical, and are supported by JAVASCRIPT functions that are unique to the present invention. These functions allow the spell check html to be presented and manipulated. Within the spell html, each misspelled word and its substitution list is isolated from the rest of the html by a separator string. That is, the spell html is split at these separators resulting in an array of strings where some of the entries are regular html and others are the misspelled words with the possible replacements separated by a different separator string. The next JAVASCRIPT function now glues this array back into html to present in the rich text area, with the regular html added. The array entries for the misspelled words are added by creating a font tag with a gray background in its style (to highlight the misspelled word) and Courier font, for example. The misspelled word is added, and an end font tag. The first misspelled word is assigned to the text area for the replacement, and its replacement list is parsed out and assigned to the option list. When the "Correct It" button is pressed, the replacement string for the misspelled word is merged into the regular html, and the entire process is repeated (the "next" misspelled word is now the first, so the effect is to work down through the misspelled words). When the "Done" button is pressed, all remaining misspelled words are merged back into the surrounding html and the corrected html string is submitted back to the server, which then assigns it to rich text edit panel.

Use of the Present Invention

The software classes described above include methods to instantiated the classes and to access the resulting objects. These software components may exist collectively or separately in libraries, in databases, on networks, on hard or floppy discs, tapes, or resident in various types of memories such as read-only, random access or removable memories. FIGS. 15A-17 may represent a high level block diagram implementing the steps of the present invention.

Figure 15A:
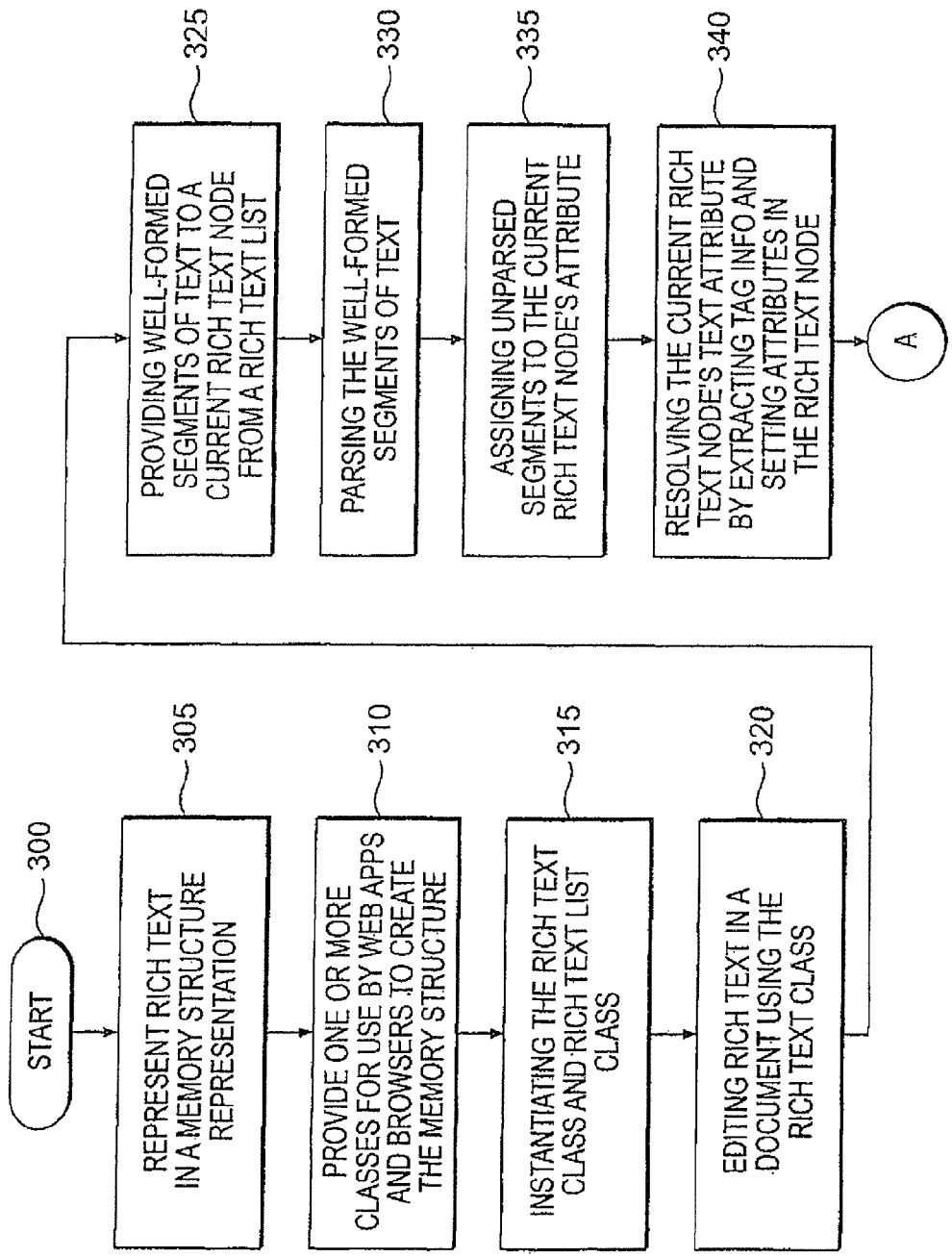
FIGS. 15A and 15B are flow diagrams show steps of using the present invention to represent rich text in a memory structure.
Figure 15B:
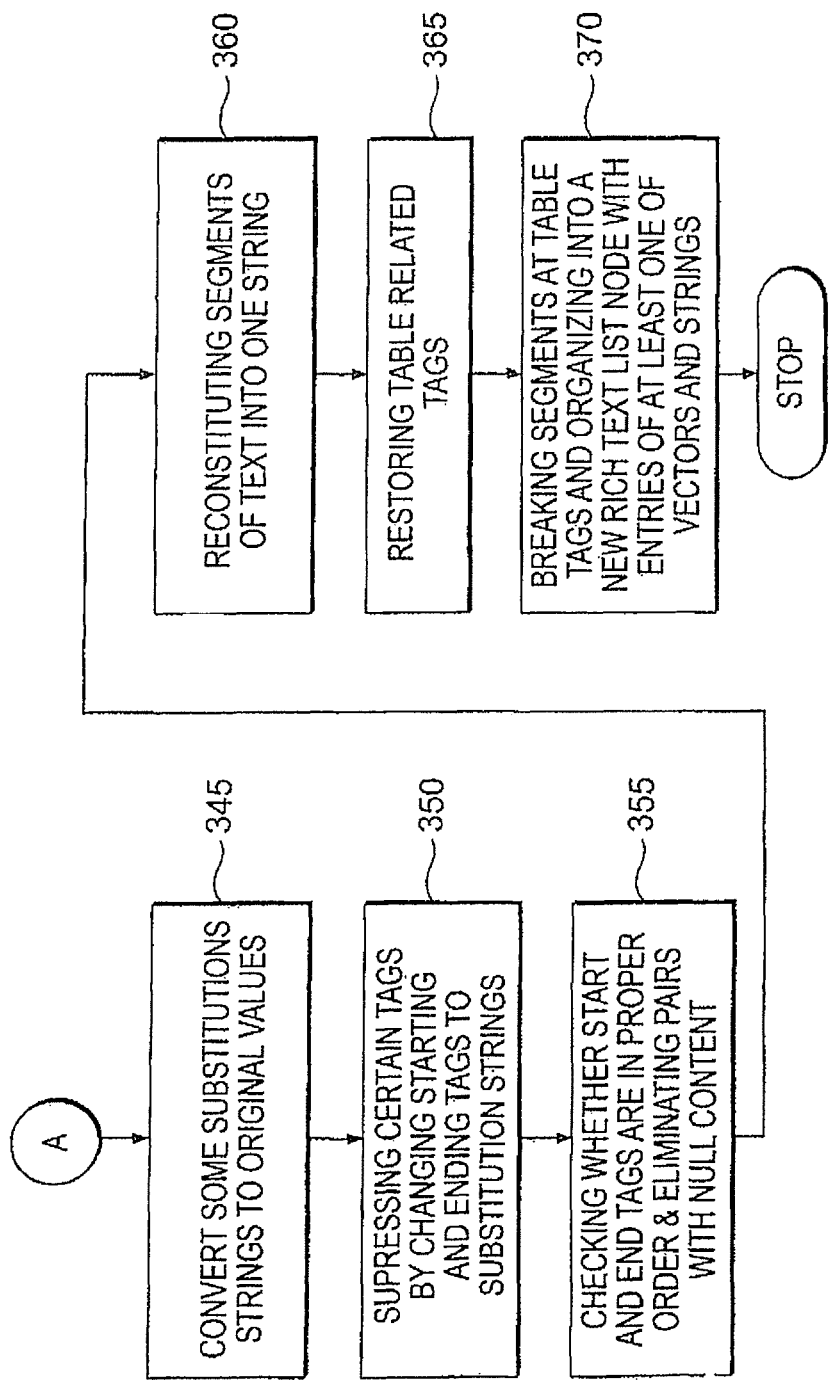

Referring to FIGS. 15A and 15B, the steps of using aspects of the present invention starts at step 300 and continues with representing rich text in a document in a memory structure representation as shown at step 305. At step 310, one or more classes are provided for use by Web based applications and browsers to create the memory structure. At step 315, the rich text class and rich text list class are instantiated, as necessary, by any associated program. At step 320, editing the rich text in a document using the rich text classes is performed. At step 325, well-formed segments of text (e.g., xml or html) to a current rich text node are formed from a rich text list node. This well-formed text is then parsed at step 330 and any unparsed text is assigned to the current node's attribute at step 335. At step 340, resolution of the current rich text node's text attribute is performed by extracting tag information and setting attributes in the rich text node. At step 345, some substitution strings are converted back to original values. At step 355, certain tags are suppressed (e.g., not relevant tags) by changing the starting and ending tags to substitution strings. At step 360, segments are reconstituted into one string and table related tags are restored at step 365. New rich text nodes are organized at step 370 by breaking segments at table tags and entries of a vector or a string are added as appropriate to the segments.

Figure 16:
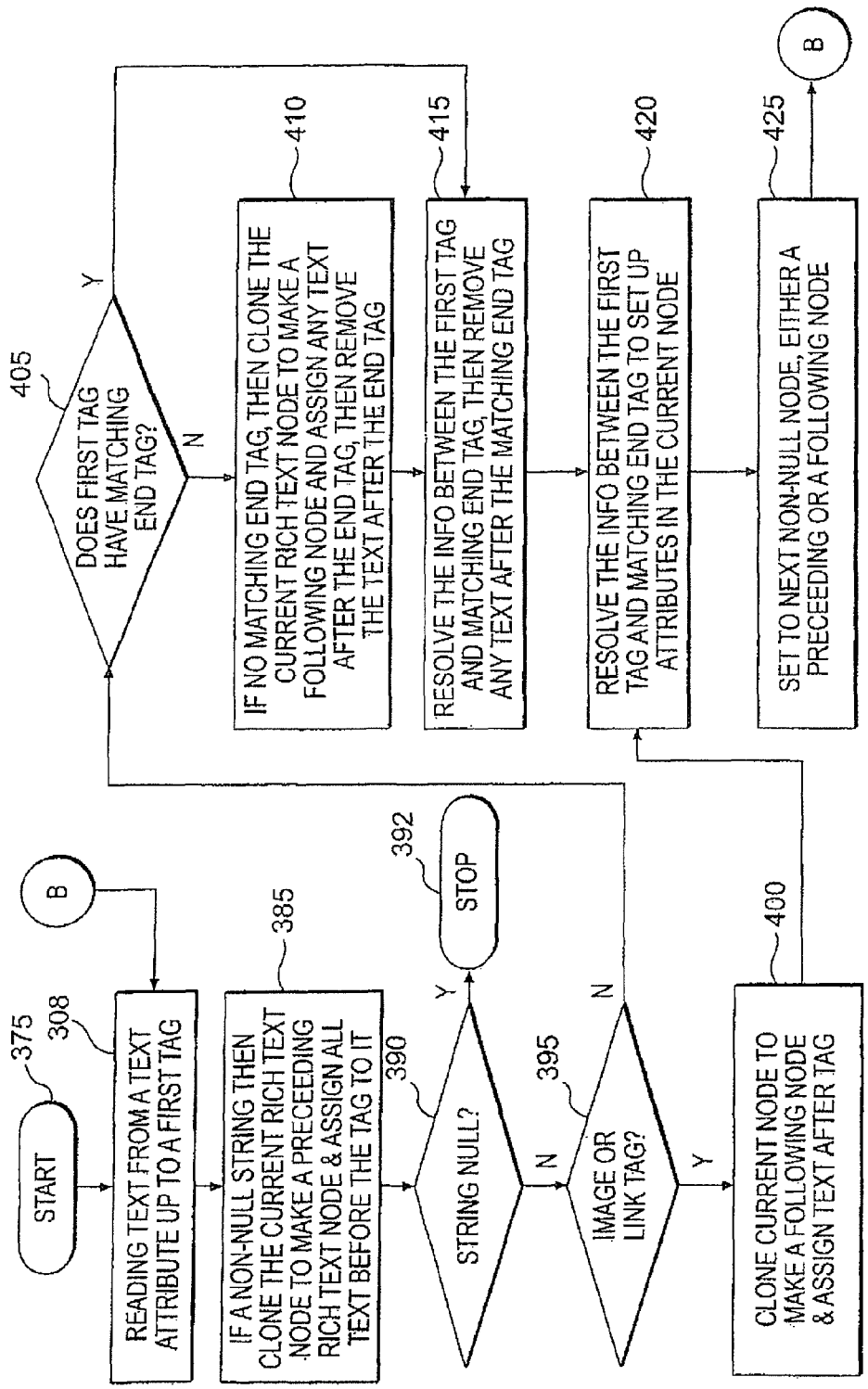
FIG. 16 is a flow diagram showing steps of processing text to represent rich text in memory structure.

FIG. 16 shows steps of creating a rich text memory structure from text (e.g., resolveHtml method) starting at 375. At step 380, text is read until a tag (e.g., a first tag) is detected. If the text is a non-null string, the current rich text node is cloned to make a preceding rich text node and assign all text before the tag (i.e., the non-null string) (step 385). At step 390, a determination is made as to whether a string is null. If no text or tags is found, then the string is null and the process terminates at step 392. At step 395, a determination is made as to whether tag is a link or image tag. However, if the tag is an image tag or a link tag, then the current node is cloned to make a following node and text after the tag is assigned to the following node (step 400). The processing will then continue with step 415. However, if the tag is not an image tag or link tag, then a check is made whether the first tag has a matching end tag at step 405. If there is no matching end tag, at step 410, the current rich text node is cloned to make a following node and any text after the end tag is assigned to clone. Then, the text after the end tag is removed. At step 415, the information between the first tag and matching end tag is resolved (e.g., resolveTag method) and any text after the tag is removed. At step 420, the information between the first tag and the matching end tag is resolved to set up attributes in the current node. At step 422, set to any next non-null node, either a preceding or a following node as shown in step 422, if both exist, then they are done in order. Processing continues at step 380.

Figure 17:
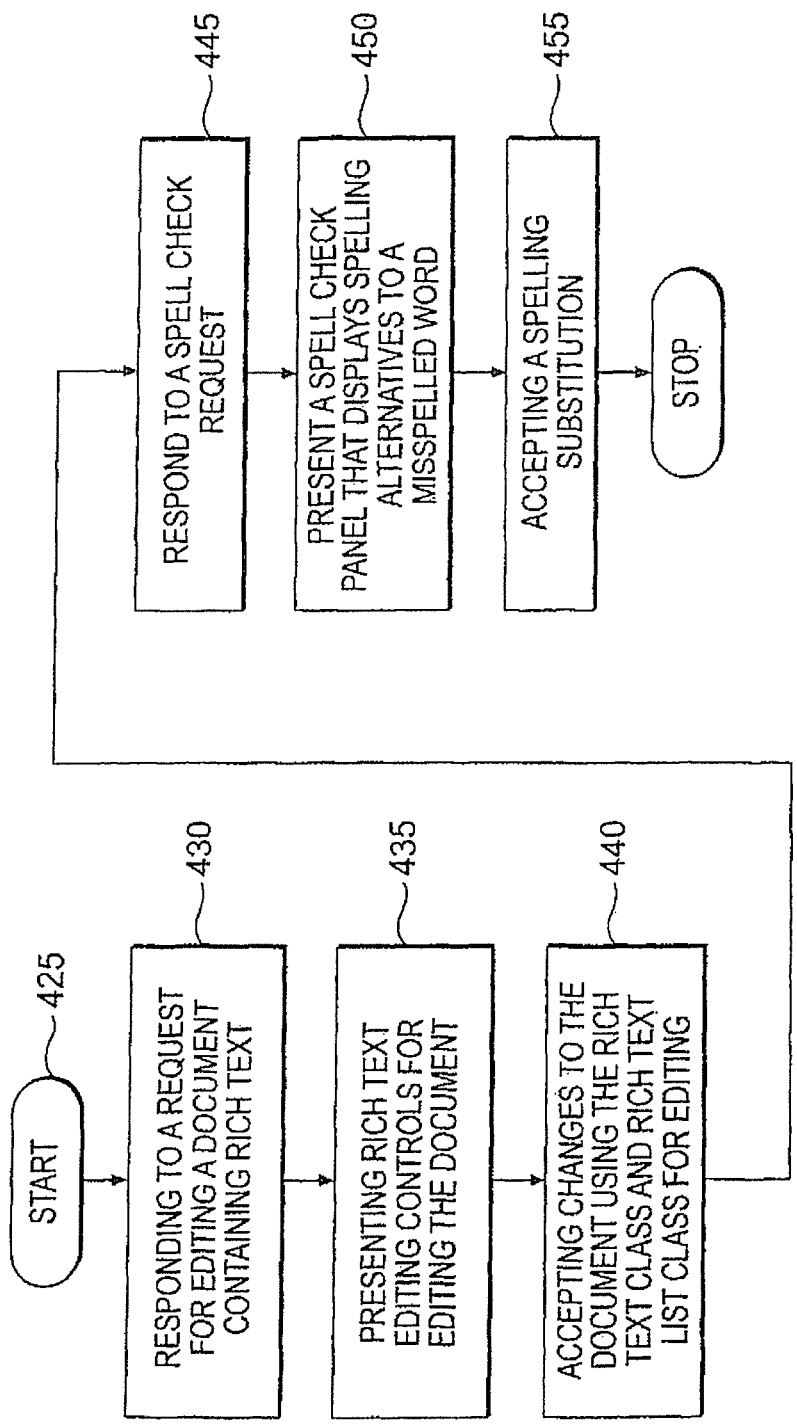
FIG. 17 is a flow diagram showing steps of using the present invention from a Web type application.

FIG. 17 shows the steps of using the present invention with interactions through a browser application or the like starting at step 425. At step 430, a response to a request is made for editing a document containing rich text. Rich text editing controls are presented for editing the document at step 435, as a response to the request. At step 440, changes are accepted to the document using the rich text class and rich text list class for editing. If a request for spell checking is made, the request is recognized and a response generated, at step 445. At step 450, a spell check panel is presented that displays spelling alternatives to a misspelled word. Upon selection of a substitution, a spelling substitution is accepted and entered into the rich text document using the rich text classes provided by this invention.

While the invention has been described in terms of preferred embodiments, those skilled in the art will recognize that the invention can be practiced with modifications and in the spirit and scope of the appended claims.

What is claimed:

1. A method of representing and managing documents having rich text for use by applications, the method performed by a computer processor comprising:
   representing rich text in a memory structure representation;
   providing one or more classes for use by the applications to create the memory structure representation, the one or more classes including a rich text list class to create a rich text list node and to manage one or more rich text nodes and a rich text class to create the one or more rich text nodes each representing a unit of the rich text, wherein the rich text is edited as plain text using an applet which runs within a web browser;
   providing well-formed segments of text to the one or more current rich text nodes from a rich text list node to initialize the current rich text nodes for representing rich text in a document;
   transforming the text from memory format into string representations, wherein the transforming comprises converting the rich text into extensible markup language (XML) and using a compressed format where various attributes of the rich text nodes are captured along with a text value for each of the rich text nodes; and
   displaying the transformed text in the document,
   wherein:
   the rich text is edited in a frame when the web browser does not provide native support for rich text edit, and
   the frame comprises a first sub-frame for editing the rich text as the plain text and a second sub-frame for displaying a result of the rich text as it is edited.

2. The method of claim 1, wherein:
   the applet has a text area that represents a cursor position and a start of selected text and an end of the selected text within the text;
   the applet determines, within the text area, which parts of the text and which particular rich text node are selected; and
   the applet selects the table and the applet updates a table node in the rich text structure.

3. The method of claim 1, wherein:
   the rich text list class is provided by an aggregate editor;
   the aggregate editor manipulates and edits a data body and recognizes rich text types; and
   the aggregate editor uses a toDb2 method to convert the string into memory representation.

4. The method of claim 3, wherein the text is provided in an output string to the aggregate editor that includes a one byte separator.

5. The method of claim 1, wherein the transforming the text memory format into string representations further comprises:
   storing one of the rich text as a string in a relational database; and
   formatting the string by converting the one of the rich text into hyper-text markup language (HTML) for storage.

6. The method of claim 5, further comprising:
   creating rich text memory structure from the HTML, wherein the creating comprises, as a function in the rich text list, to make the HTML recognizable by the rich text nodes, wherein the rich text list creates nodes for table structures within the HTML.

7. The method of claim 1, wherein the applet is linked to a hyper-text markup language (HTML) window.

8. The method of claim 1, wherein the applet is loaded and runs within the web browser.

9. A method of representing and managing documents having rich text for use by applications, the method performed by a computer processor comprising:
   representing rich text in a memory structure representation;
   providing one or more classes for use by the applications to create the memory structure representation, the one or more classes including a rich text list class to create a rich text list node and to manage one or more rich text nodes and a rich text class to create the one or more rich text nodes each representing a unit of the rich text, wherein the rich text is edited as plain text using an applet;
   providing well-formed segments of text to the one or more current rich text nodes from a rich text list node to initialize the current rich text nodes for representing rich text in a document;
   transforming the text from memory format into string representations, wherein the transforming comprises converting the rich text into extensible markup language (XML) and using a compressed format where various attributes of the rich text nodes are captured along with a text value for each of the rich text nodes; and displaying the transformed text in the document, wherein the applet is linked to a hyper-text markup language (HTML) window, the applet processes HTML and creates a rich text list to convert rich text structure back to the HTML, and the applet processes the HTML, creates the rich text structure and locates an image tag when the image tag is associated with a table.

10. The method of claim 9, wherein the applet is used to provide an image or link tag with a file name or URL that is overloaded with additional parameters by the applet intercepting a feature of the browser.

11. The method of claim 9, wherein the applet searches for an image tag with a file name of table.

12. A method of representing and managing documents having rich text for use by applications, the method performed by a computer processor comprising:

intercepting generated hyper-text markup language (HTML), creating rich text structure from the intercepted HTML, and searching for an image tag associated with a table file name using a hidden applet;

representing rich text in a memory structure representation;

providing one or more classes for use by the applications to create the memory structure representation, the one or more classes including a rich text list class to create a rich text list node and to manage one or more rich text nodes and a rich text class to create the one or more rich text nodes each representing a unit of the rich text;

providing well-formed segments of text to the one or more current rich text nodes from a rich text list node to initialize the current rich text nodes for representing rich text in a document; and transforming the text from memory format into string representations, wherein the transforming comprising converting the rich text into extensible markup language (XML) and using a compressed format where various attributes of the rich text nodes are captured along with a text value for each of the rich text nodes.

13. The method of claim 12, wherein the rich text node is rendered to plain text and the plain text is written to an output string along with a one byte separator.

14. The method of claim 13, wherein the rich text node is at least one of:

an image node that reports itself in plain text representations as an image link; and an anchor point of a table node that reports itself as a table, wherein content of the table comprises of titles and data cells which are rich text nodes that provides for editing the table by editing its plain text representation.

15. The method of claim 12, further comprising invoking a JavaScript function that brings up a new HTML panel, which provides for processing a file or URL as an image, attachment, or link.

16. The method of claim 15, further comprising providing for keys in the HTML panel, which are used to edit current text and which are added as hidden input fields.

17. The method of claim 12, wherein the hidden applet is linked to a hyper-text markup language (HTML) window.

18. The method of claim 12, wherein the hidden applet is loaded and runs within a web browser.

19. The method of claim 12, wherein the hidden applet brings up a frame that allows for creation of tables and lists when the image tag associated with the table file exists.

* * * * *